(12) United States Patent
Malik et al.

(10) Patent No.: US 11,159,460 B2
(45) Date of Patent: *Oct. 26, 2021

(54) EVENT MANAGEMENT SYSTEM

(71) Applicant: Uber Technologies, Inc., San Francisco, CA (US)

(72) Inventors: Dale W. Malik, Marietta, GA (US); Landon Robinson, Douglasville, GA (US); Ledley Yaussy, Smyrna, GA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/596,682

(22) Filed: Oct. 8, 2019

(65) Prior Publication Data
US 2020/0044995 A1  Feb. 6, 2020

Related U.S. Application Data

(63) Continuation of application No. 15/987,730, filed on May 23, 2018, now Pat. No. 10,454,854, which is a
(Continued)

(51) Int. Cl.
*G06F 15/16* (2006.01)
*H04L 12/58* (2006.01)
(Continued)

(52) U.S. Cl.
CPC .......... *H04L 51/04* (2013.01); *G06Q 10/109* (2013.01); *G06Q 10/1095* (2013.01);
(Continued)

(58) Field of Classification Search
CPC .... G06Q 10/1095; G06Q 10/06; G06Q 50/01; H04L 51/32; H04L 12/1818; H04L 67/22; H04L 67/325
(Continued)

(56) References Cited

U.S. PATENT DOCUMENTS 6,732,103 B1 *  5/2004  Strick ................... G06Q 10/109
8,690,062 B1 *  4/2014  Qureshi ............. G06Q 10/1093
                                                           235/462.41
(Continued)

OTHER PUBLICATIONS

Final Office Action dated Aug. 28, 2015 for U.S. Appl. No. 13/706,925, 17 pages.
(Continued)

*Primary Examiner* — Hee Soo Kim
(74) *Attorney, Agent, or Firm* — Fenwick & West LLP

(57) ABSTRACT

Event management operations are enabled. The operations can include receiving a request to manage an event on behalf of an event sponsor identity associated with an event sponsor, the request including event information including a description of the event, invitee identities associated with invitees to the event and invitee contact information associated with the invitees, generating an event invitation message including the description of the event and an instruction for responding to the event invitation message, directing the event invitation message to be sent to the invitee contact information associated with the invitees, determining that responses to the event invitation message have been received from a set of the invitees, generating an event update message based on a sorting of the responses from the set of the invitees, and directing the event update message to be sent to sponsor contact information associated with the event sponsor.

14 Claims, 11 Drawing Sheets

Related U.S. Application Data continuation of application No. 15/238,218, filed on Aug. 16, 2016, now Pat. No. 9,998,408, which is a continuation of application No. 13/706,925, filed on Dec. 6, 2012, now Pat. No. 9,444,859.

(51) Int. Cl.
*H04L 29/06* (2006.01)
*G06Q 10/10* (2012.01)
*H04W 4/14* (2009.01)

(52) U.S. Cl.
CPC .............. *H04L 51/02* (2013.01); *H04L 51/32* (2013.01); *H04L 65/403* (2013.01); *H04W 4/14* (2013.01)

(58) Field of Classification Search
USPC ......................................................... 709/204
See application file for complete search history.

(56) References Cited

U.S. PATENT DOCUMENTS

| | | | | |
|---|---|---|---|---|
| 8,694,633 B2* | 4/2014 | Mansfield | ............... | G08B 21/24 709/224 |
| 10,462,238 B1* | 10/2019 | Naganathan | ............ | H04L 51/34 |
| 2003/0004773 A1 | 1/2003 | Clark et al. | | |
| 2005/0033615 A1* | 2/2005 | Nguyen | ............. | G06Q 10/1095 705/5 |
| 2008/0104065 A1 | 5/2008 | Agarwal et al. | | |
| 2008/0134069 A1 | 6/2008 | Horvitz | | |
| 2009/0132665 A1 | 5/2009 | Thomsen et al. | | |
| 2009/0204414 A1 | 8/2009 | Shah | | |
| 2011/0029622 A1 | 2/2011 | Walker et al. | | |
| 2012/0161971 A1* | 6/2012 | Nasir | ....................... | G07C 1/10 340/573.4 |
| 2012/0284637 A1 | 11/2012 | Boyer et al. | | |
| 2013/0297625 A1* | 11/2013 | Bierner | ................... | G06F 16/33 707/754 |
| 2014/0074952 A1* | 3/2014 | White | .................... | H04L 51/36 709/206 |
| 2014/0214471 A1* | 7/2014 | Schreiner, III | ..... | G06Q 10/1095 705/7.19 |
| 2015/0149231 A1* | 5/2015 | Nicolas | .................. | H04W 4/02 705/7.19 |
| 2015/0170045 A1* | 6/2015 | Kirkham | ................ | G06Q 10/06 706/11 |

OTHER PUBLICATIONS

Non-Final Office Action dated Feb. 13, 2015 for U.S. Appl. No. 13/706,925, 20 pages.
Non-Final Office Action dated Jan. 29, 2016 for U.S. Appl. No. 13/706,925, 14 pages.
Notice of Allowance for U.S. Appl. No. 13/706,925, dated May 16, 2016, 10 pages.
United States Office Action, U.S. Appl. No. 15/238,218, dated Jul. 27, 2017, ten pages.

\* cited by examiner

EVENT MANAGEMENT SYSTEM

RELATED APPLICATION

This application is a continuation of co-pending U.S. application Ser. No. 15/987,730, filed May 23, 2018, which is a continuation of U.S. application Ser. No. 15/238,218, filed Aug. 16, 2016 (now U.S. Pat. No. 9,998,408), which is a continuation of U.S. application Ser. No. 13/706,925, filed Dec. 6, 2012 (now U.S. Pat. No. 9,444,859), which are incorporated herein by reference in their entirety.

TECHNICAL FIELD

This disclosure relates generally to event management using a cloud based event management server.

BACKGROUND

Coordinating regular social events and informal outings among more than three people can be difficult using currently available communication tools. Managing and scheduling an event becomes particularly complex when there is information that changes before an event occurs. Often, multiple and redundant communication threads are needed between people attending the event, requiring those attending to continuously be available to answer messages (e.g., phone calls or emails).

The above-described deficiencies associated with mobile device authentication are merely intended to provide an overview of some of the problems of conventional systems, and are not intended to be exhaustive. Other problems with the state of the art and corresponding benefits of some of the various non-limiting embodiments may become further apparent upon review of the following detailed description.

DETAILED DESCRIPTION

Figure 1:
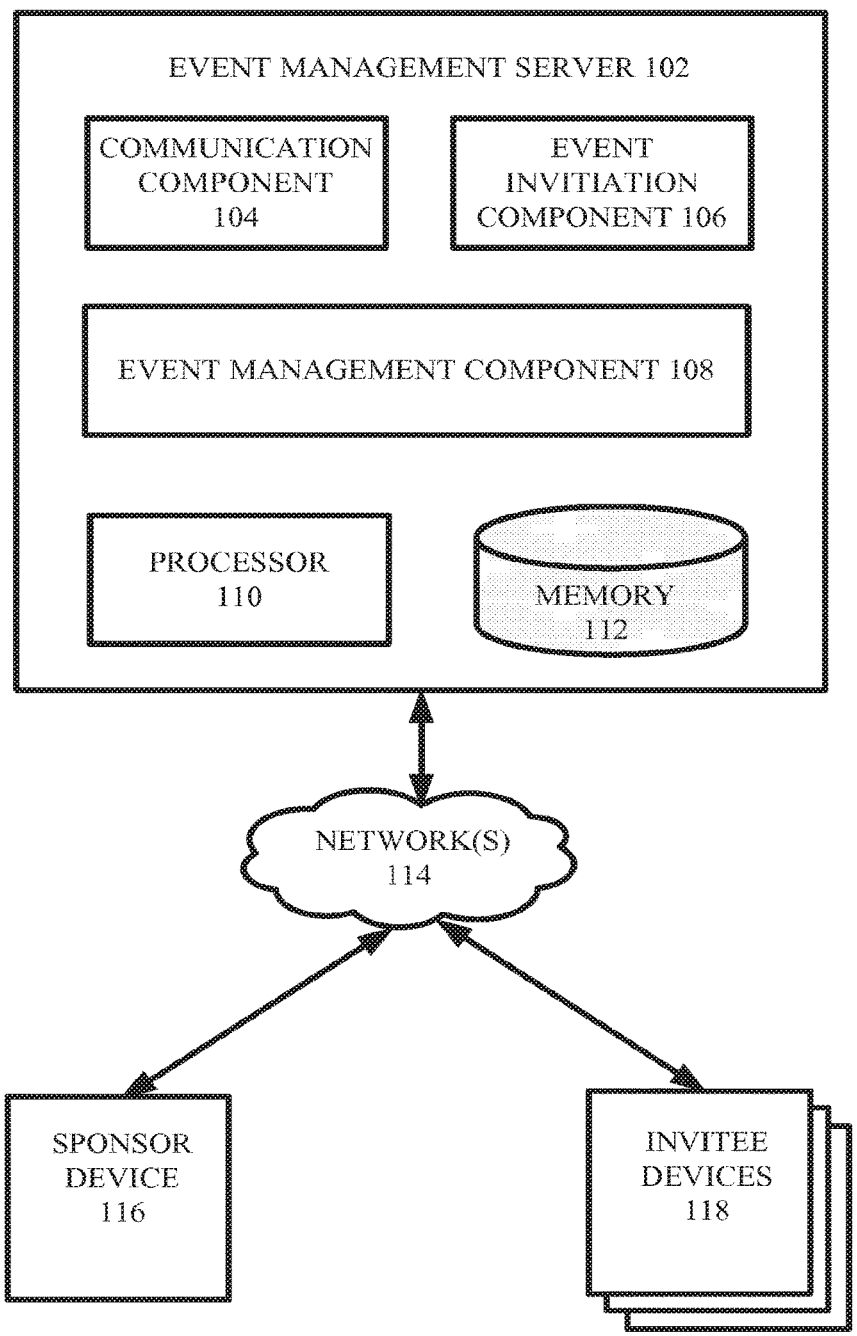
FIG. 1 illustrates a block diagram of an example system for scheduling and managing an event using a cloud based server, in accordance with various aspects and embodiments described herein.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As alluded to above, management of event scheduling can be a pain for more than a few people. For example, a coach of a children's soccer team often communicates with many children and parents when scheduling a soccer practice. Calling, emailing or using a web based invitation program to coordinate and manage the event, (soccer practice), can be inefficient, especially when management involves two way communication on a regular basis. In order to manage the event, the coach has to tally individual responses, sort through emails, respond to each person's questions, send out updates to attendees, and hope everyone received responses in an organized and logical fashion that does not initiate additional confusion about the event amongst attendees prior to the time of the event.

In view of these and/or other considerations, the subject disclosure presents system and methods for efficiently scheduling and managing event. In an aspect, the system can be employed using an application installed or accessible to a user device (e.g. a personal computer or smartphone) that employs a networked application server to manage event invitations, updates, event information and information to be shared related to an event. The event can be as simple as a group of friends going out to dinner, a team sport practice, or any social gathering. The application/user device allows a user or event sponsor to select recipients who will receive a message containing information on the event, and instructions on how to reply, obtain updates, receive further information, inquire with the sponsor or attendees, and post media related to the event to share with others. The application/user device employs an adjunct complete over site management schema that resides on a network application server to send out event invitations, collate responses, provide updates about the event, and provide interactive services to the members of the event. In an aspect, the application server utilizes subscriber messaging service (SMS) capabilities service logic, accessible via a network, to communicate with invitees on behalf of the sponsor.

The disclosed systems and methods for event management allow event management to proceed while the event sponsor may not be able to answer emails, text messages, phone calls, and etc. about an event. In particular, the network application server can perform event management on behalf of the sponsor (e.g. answer emails, text messages, accept invitation responses, and etc.) and push event update reports to the event sponsor having summarized information about the progress and management of an event on a scheduled basis (e.g. once a day, every three responses from invitees, and etc). In this manner an event can be effectively managed when the event sponsor in inaccessible. In addition, the subject event management systems and methods do not require event invitees to install specialized software on their user devices or subscribe to a specialized service in order to receive information about an event and communicate responses to the event sponsor. On the contrary, invitees can receive and respond to event invitations using traditional messaging techniques provided by their user device (e.g. text messaging, emailing, calling and etc.).

Referring now to the drawings, with reference initially to FIG. 1, presented is a system 100 for managing an event on behalf of an event sponsor in accordance with aspects described herein. System 100 includes an event management 102 a sponsor device 102 and one or more invitee devices 118. Aspects of apparatuses, systems or processes explained herein can constitute machine-executable components embodied within machine(s), e.g., embodied in one or more computer readable mediums (or media) associated with one or more machines. Such components, when executed by the one or more machines, e.g., computer(s), computing device (s), virtual machine(s), etc. can cause the machine(s) to perform the operations described.

Event management server 102 can include one or more computers connected in a networked environment and configured to perform event scheduling and management services as described herein. Event management server 102 includes memory 112 for storing instructions (e.g., computer executable components and instructions). The event management server 102 further includes a processor 110 to facilitate operation of the instructions (e.g., computer executable components and instructions) by event management server 102.

Event management server 102 is accessible to various external devices and systems via one or more networks 114. The one or more networks 114 can include but are not limited to a cellular network, a wide area network (WAD), or a local area network (LAN). For example, event management server 102 can communicate with a sponsor device 106 and one or more invitee devices wirelessly using virtually any desired wireless technology, including, for example, cellular, WAN, wireless fidelity (Wi-Fi), Wi-Max, WLAN, and etc.

Devices capable of employing system 100, such as sponsor device 106 and the one or more invitee devices 118, can include any suitable computing device configured to communicate with event management server 102 over a network 114 and provide a user interface to send and receive messages. In an aspect, devices 116 and 118 are mobile device such as a cellular phone or smartphone (e.g., a 3GPP or 4GPP Universal Mobile Telecommunications System (UMTS) phone). Devices 116 and 18 can further include but are not limited to, an electronic notebook, an electronic pad or tablet, an electronic gaming device, a personal digital assistant (PDA), a laptop computer, a desktop computer or a set-top box, that can operate and communicate in a communication network 114 environment. Devices 116 and 118 can include similar or disparate devices and communicate over same or disparate networks 114 using same or disparate messaging services. For example, sponsor device 116 can include a laptop computer configured to computer configured to communicate with event management server 102 using hypertext transfer protocol (HTTP) over a LAN while an invitee device 118 can include a cellular phone configured to communicate with event management server 102 over a cellular network using text messaging.

Event management server 102 is configured to schedule and manage an event on behalf of an event sponsor. For example, an individual may desire to host an event such as a party, a sports match or a book club meeting. Rather than personally contacting each of the invitees to invite them to the event, receive confirmation of their attendance, provide information about the event, answer questions about the event, inform invitees of changes or updates to the event, coordinate messaging between invitees, and other event management and planning tasks, the event sponsor can employ the event management server 102 to perform event scheduling, management and planning tasks on his behalf. The event sponsor can merely provide the event management server 102 with information about the event and a list of invitees and contact information for the invitees. With this information the event management server 102 can configure an event invitation, send the event invitation to the invitees (e.g. as an electronic message, as a textual message, as a voice message, and etc.), receive responses from the invitees based on the event invitation, collate the responses, and send event update messages to the event sponsor based on the collated responses.

The event management server 102 can further perform automated event management and planning based on the information provided by the sponsor and/or using stored and/or extrinsic information related to the event, the sponsor and/or the invitees. For example, the event management server 102, can provide interactive services to the invitees, answer questions about the event on behalf of the sponsor, generate information related to the event about the sponsor, coordinate updates/changes to the event on behalf of the sponsor, and other types of event management and planning tasks on behalf of the sponsor. As a result, the sponsor can perform a substantially passive role with respect to the management of an event while the heavy lifting and burdensome event management and planning tasks are performed by a networked computing system (e.g., the event management server 102). The sponsor can receive updates about the event based on aggregated invitee responses without communicating to each of the invitees individually. The sponsor does not need to continuously check and respond to invitee messages about an event or collate responses and plan event changes based on the collated responses. Further, the sponsor can rest assured that the event is being properly planned and organized when the sponsor is unable to communicate (e.g. answer electronic mail (email), answer text messages, answer phone calls) with invitees.

In an embodiment, to facilitate event scheduling, management and planning operations, the event management server 102 includes communication component 104, event invitation component 106, and event management component 108. Communication component 104 is configured to communicate information between the event management server 102 and external devices, systems and applications. In particular, the communication component 104 can receive information from a sponsor device 116, provide information to a sponsor device 116, receive information from an invitee device 118 and provide information to an invitee device 118. Communication component can include suitable hardware and software to facilitate transmission and receipt of information over one or more networks 114 as described herein. For example, communication component 104 can include one or more antennas or transceivers.

Event invitation component 106 is configured to generate an event invitation for an event in response to a request to schedule and manage an event by an event sponsor. The event invitation component 106 can then employ communication component 104 to send the invitation to individual's designated as invitees to the event. In particular, an entity (e.g. a person, company or association) desiring to employ event management server 102 to schedule and manage an event can submit a request to the event management server 102, using a sponsor device 116 and requesting scheduling/management of an event. The request can include a variety of information that can be used by the event management server 102 to generate an event invitation and manage the event.

In an aspect, the request can include basic information about an event, such as a description of the event, invitees to the event and contact information for the invitees. Contact information for an invitee can include but is not limited to, a name for an invitee, a phone number for an invitee, an email address for an invitee, and/or a fax number for an invitee. In an aspect, an event request can indicate the type of event (e.g. party), a name for the event (e.g. Jessica's Surprise Birthday Bash), a time and date of the event, and a location of the event. For example, an event sponsor can employ an application on his or her sponsor device 116, such as a smartphone, to generate an event request. The application can provide a template for the event sponsor to fill out information about the event that the event management server 102 can user to generate an invitation for the event and to manage the event. According to this example, the event sponsor may organize a baseball game for team "Dynamite." The event sponsor can submit an event request indicating team Dynamite will have a baseball practice at "home field" on "Friday October 31 at 8 pm." The sponsor can further identify himself in the event request. For example, the sponsor can indicate that he is "Coach Rob." The event sponsor can manually provide invitee's names and contact information for the invitees (e.g. the team players, team supporters, or otherwise invited individuals), or employ contacts previously stored at his smartphone to generate the list of invitees and their contact information.

Although an event request will generally include basic information about an event, it should be appreciated that that an event request is not limited to such basic information. For example, the event request can include a variety of information related to an event that the event sponsor may desire to provide to the invitees. According to this example, the event request can include but is not limited to a long description of the event, information about the sponsor, history of the event, information about the even location, invitees to the event, cost of an event, attachments associated with the event such as directions to the event, links to related web pages, or media attachments associated with the event.

Further to content based information describing an event or related to an event and identifying invitees, in an aspect, an event request can also include event management protocol instructions. For example, the event request can provide instructions that inform the event management server 102 how to perform its' management and planning functions. These instructions can range in degree of complexity. In an aspect, the event management protocol instructions can indicate how and when the event management server is to communicate with the sponsor and the invitees. For example, the instructions can indicate a time at which an event invitation should be sent (e.g. immediately in response to the request or at a specified time and date). In another example, the instructions can indicate what form of communication (e.g. email, text, phone call) the communication component 104 should employ to communicate with invitees and the sponsor. The instructions can be general or specific. For example, the instructions can indicate the requested form of communication to invitees is via text. In another example, the instructions can indicate that the invitations should be communicated to invitees initially by email, followed by a reminder text if a response is not received, and lastly followed by a phone call if a response is further not received. Further, the instructions can be tailored to specific invitee's. For example, the instructions can indicate that the event management server should contact "Tommy" only after 6 pm and "Susie" only on weekends and via phone calls.

Event management protocol instructions can also indicate how often the sponsor wants to receives updates about an event, triggers for updates, and triggers for targeted notifications. For example, a sponsor can define in his event request that he wants to receive updates on an event once a day, or once all invitees have responded. In another example, the sponsor can define that he wants to receive updates when an invitee does not respond after three attempts to contact the invitee by the event management server 102. In yet another example, the sponsor can request to receive an update when an invitee indicates he will be late to the event. It should be appreciated that information that can be included in an event request, including the above described event based content and management protocol, can vary with the intentions of the event sponsor, the specifics of an event, and the complexity and capabilities of the event management server 102.

Other event management protocol instructions that can be carried out by the event management server include sending reminders about an event to invitees in response to pre-defined triggers or a pre-defined schedule. The event management server 102 can also be configured to send communications to invitees on an escalation regime. For example, the event management server 102 can be configured to call invitees if responses to an event invitation text message is not received a week before the event.

It should be appreciated that the event management server 102 can be pre-configured with various default event management protocol instructions. In various aspects, event management protocol instructions provided by a sponsor can supplement or override existing event management protocol instructions retained by the event management server 102 in memory 112.

After an event sponsor has created an event request, the event sponsor, via his event sponsor device 116, can the send the event request to the event management server 102. The event management server 102 processes the event request by looking at the resources and instructions provided in the request about the event. The communication component 104 will first receive the event request and provide the event request to the event invitation component 106. In an aspect, the event invitation component 106 can then generate an event invitation based at least in part on the information in the event request. In particular, the event invitation component 106 can format an event invitation using the event description information in the event request (e.g. information identifying the event, time, place and etc.) and based on any event management protocol instructions included in the event request (e.g. instructions to send the invitation via text, send with basic information, send with attached directions, send with attached item sign up list and allow for invitees to sign up for an item, send with an attached media item, and etc.). For example, the event invitation component 106 can generate an invitation that describes the event, when the event is taking place, where the event is taking place, and who is sponsoring the event. The event invitation component 106 can also employ instructions and templates stored in memory 112 to generate an event invitation.

In particular, memory 112 can include instructions defining event management protocol instructions that govern the operations of event management server 102. The event management server 102 can rely on these instructions to perform event management and planning unless alternative event management protocol instructions are specified by a sponsor in an event request. For example, memory 112 can store instructions indicating what type of information should be included in an event invitation and how to organize the information in an event invitation. According to this example, in response to a received event request, the event invitation component 106 can parse through the information provided in the request and generate an event invitation based on the instructions for event invitation generation defined in memory 112.

In another aspect, the event invitation component 106 can employ one or more formats to generate an event invitation depending on the communication means that will be used to send the event invitation (e.g. a requested by the sponsor in an event request or as determined by the event management server using instructions defined in memory 112). In particular, in various aspects, the event invitation component 106 can generate and/or format event invitations for sending to invitees as a text message (e.g. a subscriber messaging service (SMS) text message), an email, or a phone call with a recorded voice message.

For example, if the event invitation will be sent to invitees as a text message, the invitation component 106 can employ a format that accommodates information as a text message. According to this example, the format can look like a memo or fax cover sheet with a "To" line, a "From" line, a "Subject Line," and a "Description" line. Memory 112 can store a plurality of event invitation templates to be utilized with a specific communication formats (e.g., template A for a text invitation, template B for an email invitation, template C for a voice message invitation). The event invitation component 106 can employ instructions received in an event request and/or instructions stored in memory 112 to determine an appropriate communication format for an event invitation and select an event invitation format accordingly. For example, where a request specifies communication via text, the event invitation component 106 can employ a text invitation template. In another example, where a communication means is not defined in an event request, the event invitation component 106 can be configured to employ a default communication format, such as an email invitation format.

The event invitation component 106 can further format an event invitation to include instructions indicating how an invitee can respond to the event invitation and with what information. In an aspect, the event invitation component 106 will format an invitation for responding using the mechanism with which it was received (e.g. if received as a text message the invitation will be formatted for responding via a text message). In another aspect, the event invitation component can allow an invitee to provide a response to the event invitation using multiple communication options. For example, the event invitation can allow an invitee to respond by sending a text message, sending an email, sending a recorded voice message as a media attachment to a text message or email, call a voice service and record a message, and etc.

The type of information included in an event response can vary. In an aspect, an invitation can be formatted by event invitation component 106 to provide an invitee an option to send a response message accepting the invitation (e.g. confirming attendance to the event), an option to send a message indicating that the invitee is undecided as to whether they will attend the event, and an option to send a message decline attendance to the event. For example, where the invitation is sent to an invitee as a text message, the invitation can include a description of the event and indicate that the invitee should text "Y" to indicate attendance or "N" to indicate a decline of the event invitation. Responses of invitees to event invitations are sent back to the event management server 102, not the sponsor device 116.

In another aspect, the event invitation component 106 can format an event invitation to include an option for an invitee to respond with a question about the event or post information related to the event. According to this aspect, an invitee can employ an event invitation to send multiple responses to the event management server 102 or otherwise communicate with the event management server 102 regarding the event for which the invitation is based. For example, an event invitation can be formatted to allow an invitee to respond with a message (e.g. a text message, email message or voice message). The invitee can send a message having a variety of information that can be interpreted by the event management component 108. For example, the message can state that the invitee is attending or is not attending the event. In another example, an invitee can respond to an event invitation with a message directed to the event sponsor indicating he will be late to the event or a message directed to the other invitees describing what he will be wearing to the event. Still in another example, an event invitation can allow for an invitee to respond to an invitation by providing an attachment to a message. According to this example, an invitee can respond to the event invitation by attaching a media file (e.g. a picture or a video). The invitee can further specify what the event management server should do with the media file (e.g., provide it to the sponsor, provide it to the other invitees, or provide it to one or more designated invitees).

In another example, an event invitation can be formatted to allow an invitee to respond to an invitation with a question about the event, such as a question asking directions to an event or what to wear. According to this example, the event invitation can be formatted to allow an invitee to select the type of response to the invitation. For instance, the invitation can prompt a user to "respond with a question" or "submit a message." In yet another example, an event invitation for a party can be formatted to include a list of items to bring to the party and allow the invitee to respond to the invitation indicating an item off the list the invitee will bring. It should be appreciated that the manner for responding to an event invitation can be tailored to the capabilities of the invitee device 116 at which an invitee receives, views and responds to an event invitation.

In some aspects, an event sponsor can dictate the manner in which the event invitation component 106 should format an event invitation with respect to the information desired in a response to the event invitation. For example, the event sponsor can include a variety of information about an event in an event request, such as directions, attachments, media, links and etc. According to this example, the sponsor can request that this information be included in an event invitation or that this information be used by the event management component 108 to respond to questions about the event. In another example, the event sponsor can indicate that an invitation merely allow an invitee to respond to the invitation regarding their attendance to an event. Still in yet another aspect, the sponsor can include a sign up list for inclusion in an event invitation and request that the event invitation be formatted to allow the invitees to select an item on the list in response to the event invitation.

In an embodiment, an event request can represent a request to schedule an event as defined in the request. With this embodiment, upon receipt of an event request, the event management server 102 will proceed to generate an event invitation, send the event invitation and manage the event. However, in another embodiment, a sponsor can employ event management server 102 to facilitate scheduling an event. According to this embodiment, a sponsor can generate an event request with the time, date and/or location for the event being undefined. The event request can further request that the event management server 102 determine or facilitate determining, an optimal date, time and/or location for an event based on responses from invitees. For example, the event sponsor can send an event request with a list or range of dates, times, and locations the sponsor contemplates for an event, information about the event, and invitees and contact information for the invitees. Based on such a request, the event invitation component 106 can generate an event pre-invitation that prompts the invitees to select the options for times, dates, and/or locations that the invitee is agreeable with and/or disagreeable with.

According to this embodiment, in an aspect, the event management server 102 can collate the invitee responses and provide the sponsor with a message summarizing the invitee responses. For example, the message can include one or more optimal dates, times, and locations for the event that the majority of the invitees are agreeable with. In turn, the sponsor can solidify a date, time and/or location for the event and instruct the event management server to proceed to generate a formal event and to manage the event as described herein. In another aspect, the event management server 102 can be configured to select an optimal date, time and/or location for the event based on majority response of the invitees on behalf of the sponsor. The event management server 102 can then proceed to schedule and manage the event without additional input from the sponsor. The event management server 102 can however inform the sponsor of the date, time, and/or location it selected for the event.

Once the event invitation component 106 has generated and formatted an event invitation (or event pre-invitation), the event invitation component 106 can employ the communication component 104 to send the event invitation to invitees designated in the event request using contact information for the invitees provided in the event request (e.g., cellular phone numbers and/or email addresses for the invitees). For example, the communication component 104 can send the event invitation to invitees as a text message over a cellular network or an email over a WAN. The event invitation is received by the invitees at invitee devices 118 associated with the respective invitees (e.g. a phone to which a voice or text event invitation is sent or a computing device via which an invitee access an email account to which an email event invitation is sent).

In various aspects, as discussed infra, the communication component 104 employs one or more external servers, systems or applications to facilitate sending an event invitation to invitees. For example, in order to send an event invitation, the communication component 104 can request sending of the event invitation using an external SMS, email service, or voice messaging service accessible to and/or affiliated with event management server 102. According to this aspect, the event management server 102 can further employ such external services/servers to receive responses to invitations from invitees. As noted above, responses by invitees to event invitations, or other communications provided by the event management server 102 to invitees, are sent back to the event management server, not the sponsor device 116, for handling thereof. The event management sever 102 then processes responses to event invitations and/or other communications received by invitees and/or the sponsor. In particular, the event management server 102 employs event management component 108 to collate responses and manage a scheduled event on behalf of the sponsor, as discussed in greater detail with respect to FIGS. 2 and 3.

Figure 2:
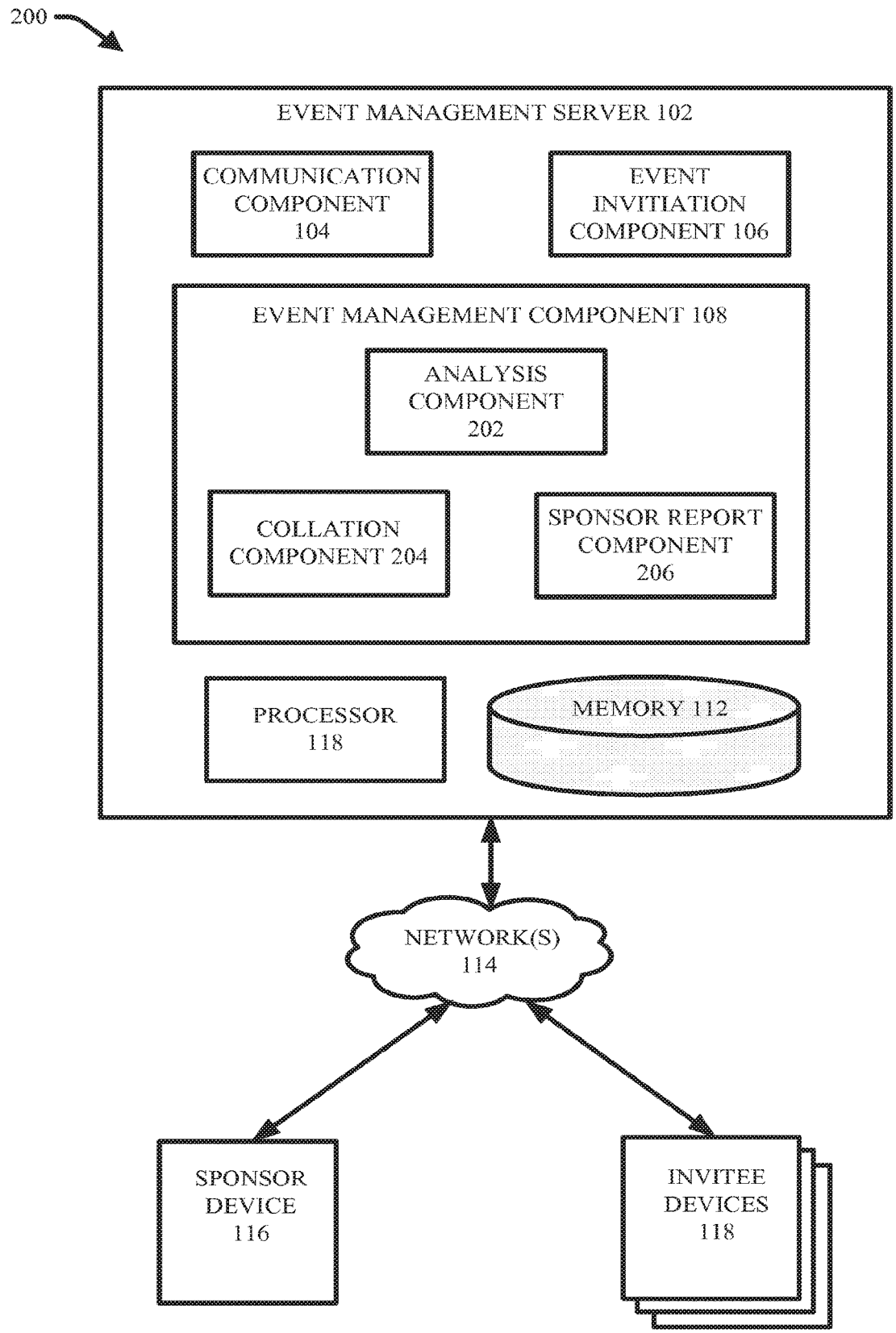
FIG. 2 illustrates a block diagram of another example system for scheduling and managing an event using a cloud based server, in accordance with various aspects and embodiments described herein.

Referring now to FIG. 2, presented is another system 200 for managing an event on behalf of an event sponsor in accordance with aspects described herein. System 200 is similar to system 100 with the addition of various components to the event management server 102. In particular, in system 200 the event management component 108 includes analysis component 202, collation component 204 and sponsor report component 206. Repetitive description of like elements employed in respective embodiments of systems and devices described herein are omitted for sake of brevity.

Collation component 204 is configured to collate invitee responses. As used herein, the collation of responses by collation component 204 includes the collection of invitee responses, the analysis of the responses and the integration and organization of the responses based on the analysis. For example, the collation component 204 can collect invitee responses and analyze the invitee responses to determine what invitees have accepted attendance to an event and what invitees have declined attendance. In another aspect, the collation component 204 can examine invitee responses to an event pre-invitation and determine one or more dates that a majority of invitees are agreeable with for an event to take place. In another example, the collation component 204 can collate invitee questions or suggestions about an event. According to this example, the collation component 104 can identify similar questions or conflicting assumptions regarding an event based on invitee responses. For example, the collation component 204 can determine that several invitees are unsure what the appropriate attire for and event is. In another example, the collation component 204 can further collate response indicating the several invitees cannot attend the event until after 8 pm. In an aspect, the collation component 204 can further suggest that the event time be changed to 8 pm.

The sponsor report component 206 is configured to generate an event update report based on responses received from invitees and information related to the event that surfaces throughout the course of event management by the event management server 102. The sponsor report component 206 can employ communication component 104 to send event update reports to the sponsor (e.g., via at sponsor device 116) and/or one or more invitees (e.g. at invitees devices 118). In an aspect, the sponsor report component 206 can report each received response from an invitee to the sponsor as it is received. However, in another aspect, the sponsor report component 206 can generate an event update report based one or more collated responses. According to this aspect, the sponsor can receive a report that summarizes, organizes, and analyzes invitee responses to event invitation messages and other communications between an invitee and event management server 102. For example, a sponsor may desire not to be burdened with multiple unnecessary communications from the event management server regarding an event. In an aspect, the event management protocol, as provided by a sponsor or engrained within event management system, can facilitate reducing and/or eliminating unnecessary communications to the event sponsor regarding an event. Still in another aspect, the event management component 108 can employ sponsor report component 206 to otherwise communicate information to an event sponsor when necessary and not prohibited by event management protocol.

For example, the sponsor report component 206 can be configured to generate an event update report message that indicates what invitees have declined and/or accepted an event invitation. In another example, the sponsor report component can generate an event update report message indicating what invitees have declined and/or accepted the event invitation with notes associated with specific invitees based on their responses. For example, such notes can state what the respective invitees will be bringing to the party, what entre they have selected, if they will be late, if they are injured and cannot fully participate, and etc. In another example, the sponsor report component 206 can generate an event update report message that includes an organized list of common questions received from invitees or a compilation of relevant material about the event provided by the invitees. Still in yet another example, the sponsor report component 206 can generate an event update report that summarizes products of invitee intercommunication and coordination facilitated by the event management server (as discussed infra).

The sponsor report component 206 can be configured to generate event update reports based on event management protocol defined in memory and/or received from an event sponsor (e.g. in an event request or in a subsequent communication by the event sponsor to the event management server 102). The event management protocol can define when event update reports are to be communicated to the sponsor, how they are to be communicated to the sponsor, and what information is to be included in an event update report. For example, event management protocol can direct the sponsor report component 206 to send event update reports to the sponsor as a text message or an email once all invitees have responded to an event invitation. In another example, event management protocol can direct the sponsor report component 206 to send an event update report once a day or once a week. According to these examples, the event management protocol can indicate that information in the event update reports include information based on collated responses. For example, the sponsor report component, as directed by event management protocol, can generate an event update report daily that includes a summary and analysis of invitee responses received and information generated about an event received during the day or week.

In another aspect, an event sponsor can send a request to the sponsor report component 206 to receive an update report on an event. The sponsor report component 206 can then send the event update report to the sponsor in response to his request for the update report. According to this aspect, the sponsor report component can generate an update report based on collated invitee responses received, and other information generated about the event by event management system, up to the time of the request by the sponsor for the update report.

In another example, event management protocol can instruct the sponsor report component 206 to generate an event update report containing specific information in response to a trigger. For example, the sponsor report component 206 can be configured to send event update reports in response to receipt of an invitee response that has been marked by the invitee as urgent or in response to receipt of a response from an invitee that has been singled out (e.g., a response from a team leader or CEO). Such an event update report can include the invitee's urgent message or the singled out invitee's message alone (e.g. does not include collated information). In another example, the sponsor report component 206 can be configured to send an event update report indicating the location of absent invitees 15 minutes prior to the start time of an event.

In an aspect, analysis component 202 is configured to analyze information received from a sponsor and/or an invitee and make various determinations based on the information regarding event scheduling, planning, progress and management. In particular, analysis component 202 can serve as the brain of the event management component 108. In an aspect, analysis component 202 can analyze an event request to determine the type of information to include in an event invitation or event pre-invitation based on the request. According to this aspect, the event invitation component 106 can employ the analysis component 202 when generating an event invitation.

In another aspect, when collating invitee responses, the collation component 204 can employ analysis component 202 to analyze the content in invitee responses to facilitate collating responses and making conclusions based on the collated responses. For example, the collation component 204 can employ analysis component 202 to determine correlations amongst invitee responses. According to this example, the analysis component 202 can determine that several invitees expressed concern that the weather may impact their ability to attend the event on time. In another aspect, the analysis component 202 can analyze information received from invitees in response to an event invitation or event pre-invitation to determine how the information should be processed. For example, the analysis 202 component can analyze an invitee response and determine that the response is a question that solicits a response from the event management server 102. As described infra, the analysis component 202 can further analyze the question and determine an appropriate answer to the question for sending back to the invitee. In another example, the analysis component 202 can analyze an invitee response and determine that the invitee has provided information to be shared with the other invitees.

The analysis component 202 can employ various resources to make intelligent determinations regarding event planning, scheduling, and management. In an aspect, memory 112 can store one or more look-up tables, flow charts, algorithms or other computer based logic schemas relating information that is likely to be received by a sponsor and/or an invitee to action responses and/or conclusory values and organizational schemas. In an aspect, such information can be organized based on type of event (e.g., party, sports match, club meeting, charity event, school function, and etc.). The analysis component 202 can further employ information received from a sponsor in an event request 202 and information received from an invitee in a response to an invitation.

Figure 3:
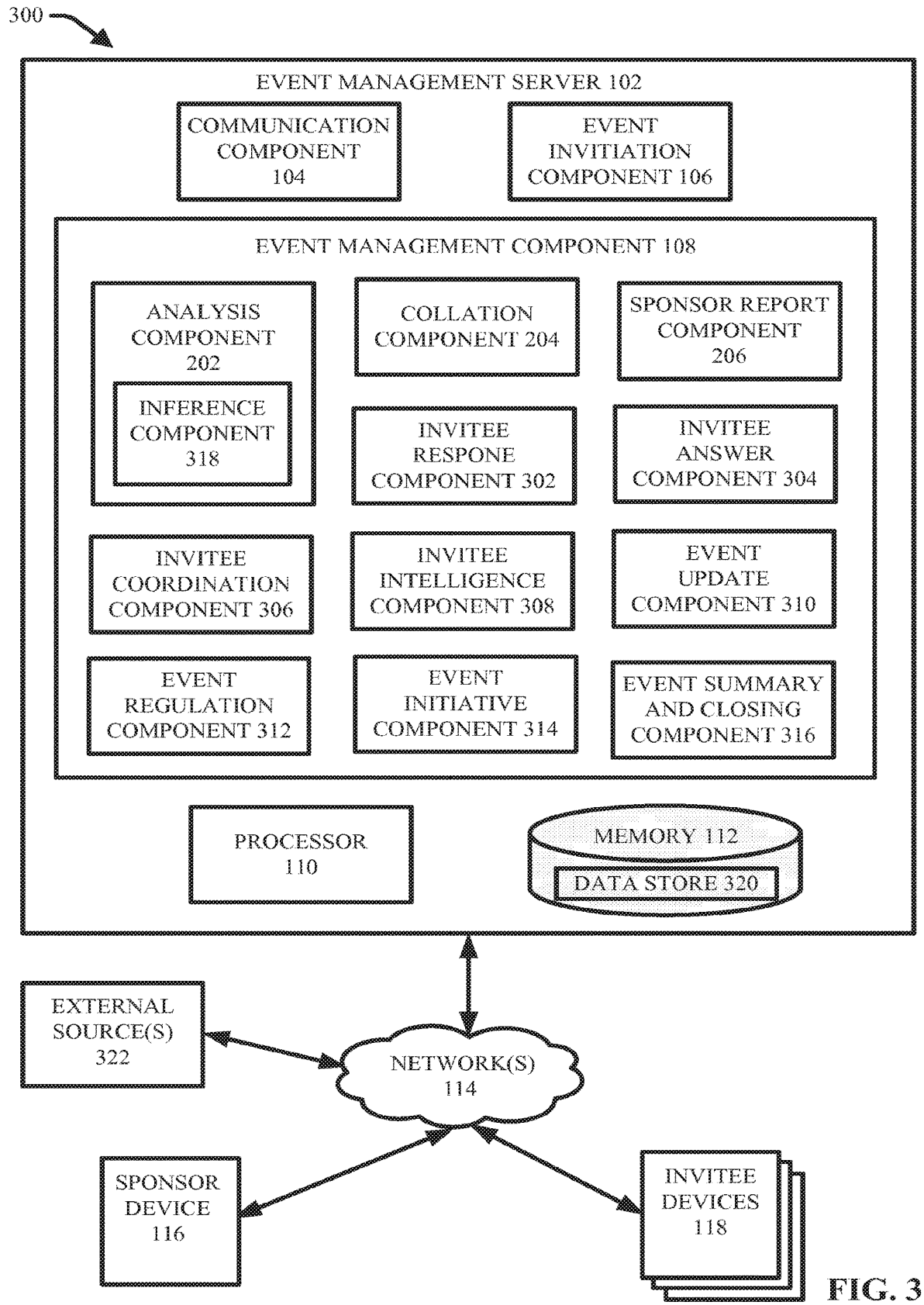
FIG. 3 illustrates a block diagram of another example system for scheduling and managing an event using a cloud based server, in accordance with various aspects and embodiments described herein.

Turning now to FIG. 3, presented is another system 300 for managing an event on behalf of an event sponsor in accordance with aspects described herein. Repetitive description of like elements employed in respective embodiments of systems and devices described herein are omitted for sake of brevity.

System 300 is similar to system 200 with the addition of various components to the event management server 102 that facilitate various additional event management, planning and scheduling capabilities of system 300. In particular, in system 300 the event management component 108 includes inference component 318 in association with analysis component 202, invitee response component 302, invitee answer component 304, invitee coordination component 306, invitee intelligence component 308, event update component 310, event regulation component 312, event initiative component 314, and event summary and closing component 316. The event management sever 102 further includes data store 320 within memory 112. System 300 can also include one or more external sources 322 that can be accessed by event management server 102 via one or more networks 114.

Data store 320 is configured to store information received by and generated by event management server 102 regarding an event, a sponsor, and/or an invitee. For example, data store can store information received from a sponsor in an event request, as invitees to the event, contact information for the invitees, and general information. Data store 320 can further store information generated during the course of managing an event such as invitee responses, sponsor update reports send to sponsor and related information, information received from a sponsor in an event update/change notification (discussed infra), changes/modification made to the event and reasons for such changes made by invitees and/or the event management server 102, determined/inferred invitee preferences, determined/inferred sponsor preferences, and etc. In various aspects, as described below, the event management component 108 can employ one or more external resources 322 (e.g. external data sources, search engines, or applications) to gather information needed to answer an invitee's or sponsor's question about an event, to coordinate invitees and facilitate communication between invitees, and to suggest changes or updates to an event. Such gathered information can also be stored by data store 320. Information stored in data store 320 can be employed by the analysis component 202 and/or other components of event management server 102 to facilitate the management and planning of a current event and/or a future event.

As noted above, in an aspect, analysis component 202 is configured to analyze information received from a sponsor and an invitee and make various determinations based on the information regarding event scheduling, planning, progress and management. The analysis component 202 can further employ one or more external sources 322 and information stored in data store 320 to make determinations regarding a current or future event. For example, a sponsor may employ event management server 102 to schedule and manage several events and/or a reoccurring event. According to this example, the event management server 102 can utilize information stored in data store 320 to facilitate the scheduling and management of another event or reoccurring event for a sponsor. For instance, the management server 102 can receive a request from a sponsor to schedule another baseball practice for a new date and time using the information and management protocol instructions provided by the sponsor and employed by event management server 102 for a previous baseball practice event request. In response, the event management server 102 can employ analysis component 202 to analyze stored contact information for invitees, a previously generated event invitation, previous learned associations between invitees and invitee preferences and etc., to facilitate scheduling and management of the new event.

In another example, the event management server 102 can receive a request for a new event from a same or new sponsor. The event management server 102 can employ analysis component 202 to analyze the request for the new event in view of information stored in data store 320 to determine similarities between the new event request and one or more previous event requests, and manage the new event based in part on information stored in data store 320 regarding the previous similar event. For example, the analysis component 202 may identify that the new event request is for a wedding having 300+ people. The analysis component 202 can further identify information in data store 320 relating to a previous event request for a wedding having 300+ people. The analysis component 202 can then employ information in data store 312 related to the previous similar event request to efficiently manage the new event request. For example, the analysis component 202 may determine that many of the invitees from the previous event requested information pertaining to a gift registry. Accordingly, the analysis component 202 may determine that the event invitation component 106 should include such information in the original event invitation for the new event. As discussed below, the event initiative component 314 can facilitate employing analysis component 202 to identify suggestions and modification to an event and automatically implement such suggestions/modifications or provide such suggestions/changes to the sponsor report component 206 for inclusion in an event update report.

In an embodiment, analysis component 202 can include an inference component 318 to facilitate making inferences or determinations in connection with current or future event scheduling, event planning, progress and management. For example, inference component 318 may employ learned associations between invitees to suggest carpooling between the invitees to an event. In another example, inference component 318 can infer, based on past dealings with a particular invitee, that the particular invite will not respond to an event invitation unless it is sent as a voice mail. Accordingly, the event management 108 can employ inference component 318 to infer appropriate actions to take when communicating with invitees in the future.

In order to provide for or aid in the numerous inferences described in this disclosure, inference component 318 can examine the entirety or a subset of data to which it is granted access in order to provide for reasoning about event management and planning decisions. Inference component 318 can be granted access to any information associated with system 300 (and additional system described herein), including information received or generated by system 300, event management protocol stored in memory 112, information stored in data store 320, as well as accessible extrinsic information accessible to event management server 102 via one or more networks 114.

Inference component 318 can perform inferences to identify a specific context or action, or to generate a probability distribution over states, for example. The inferences can be probabilistic—that is, the computation of a probability distribution over states of interest based on a consideration of data and events. An inference can also refer to techniques employed for composing higher-level events from a set of events or data. Such inference can result in construction of new events or actions from a set of observed events or stored event data, whether or not the events are correlated in close temporal proximity, and whether the events and data come from one or several event and data sources. Various classification (explicitly or implicitly trained) schemes or systems (e.g., support vector machines, neural networks, expert systems, Bayesian belief networks, fuzzy logic, data fusion engines, etc.) can be employed in connection with performing automatic or inferred action in connection with the claimed subject matter.

A classifier can map an input attribute vector, x=(x1, x2, x3, x4, xn), to a confidence that the input belongs to a class, such as by f(x)=confidence(class). Such classification can employ a probabilistic or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used in this disclosure also is inclusive of statistical regression that is utilized to develop models of priority.

Invitee response component 302 is configured to receive invitee responses to event invitations and other communication messages sent to invitees from the event management server and employ analysis component 202 and/or inference component 318 to determine how to process the invitee responses. In an aspect, the invitee response component 302 analyzes an invitee response to determine if the response includes information to be collated and provided to the event sponsor in event update report and/or if the response includes information requiring additional action by the event management component 108. If the invitee response does not prompt additional action by the event management component, the invitee response component 302 can send the response to the collation component 204 for collation thereof. For example, such a response can include a response that merely indicates an invitee will or will not attend the event. Other invitee responses that may not prompt additional action by the event management component 108 include invitee responses that include information to be provided to the event sponsor about an event. Such information can simply be collated and provided to the event sponsor in an event update report.

Invitee responses that prompt additional action by the event management component 108 include but are not limited to, requests to post or share messages/information with other invitees, requests to receive additional information about an event, responses indicating an issue or problem associated with the event, and responses prompting coordination and intercommunication between invitees. In particular, event management server 102 is configured to act on behalf of an event sponsor and manage an event by communicating information with invitees, answering questions for invitees, facilitating communication between invitees, coordinating invitees, and otherwise managing and planning an event for the event sponsor. Information that is received or generated by the event management server throughout the course of event management can also be provided to event collation component 204 for collation thereof and inclusion in an event update report.

In an aspect, the invitee response component 304 determines that an invitee response includes a message with information about the event that the invitee desires to share with other invitees. According to this aspect, the invitee response component 302 can employ invitee answer component 304 to send the information to the other invitees. Invitee answer component 304 is configured to generate additional messages having answers to an invitee question and send the additional messages to the invitee. The invitee answer component can configure additional messages for sending to invitees in a suitable format (e.g. text, email, voicemail) In some aspects, the invitee answer component 304 formats additional messages with instructions for allowing invitees to respond to the additional messages.

In another aspect, the invitee response component 302 can determine that an invitee response includes a message that should be shared with a subset of the other invitees based on a relationship between the invitee's response and the subset of the other invitees. For example, an invitee may respond to an event invitation with a message indicating that she needs a partner for the event. The invitee response component 302 can analyze the message to determine the content of the response. The invitee response component 302 can further analyze other invitee responses. For example, the invitee response component 302 can determine a subset of invitees indicating that they need partners for the event. The invitee response component 302 can thus identify the subset of invitees as related to the invitee's message indicating she needs a partner. The invitee response component 302 can then employ the invitee answer component 304 to share the invitee's message indicating she needs a partner to the event with the other invitees indicating that they need a partner to the event.

In another aspect, the invitee response component 302 can determine that an invitee response to an event invitation includes a question about the event. For example, an invitee response can include request directions to an event or ask a question about parking at the event. According to this aspect, the invitee response component can employ analysis/inference component 202/318 to analyze the question and generate and answer to the question. The invitee response component 302 can then employ invitee answer component to generate and send an answer message to the invitee asking the question. In an aspect, in order to answer invitee questions, the invitee answer component employs analysis/inference component 202/318 to analyze the question based on various information event management component 108 is given access to. For example, the invitee answer component 304 can employ analysis component 202 to analyze an invitee question based in part on information provided by the event sponsor, responses from other invitees, information gathered about the other invitees, and information from an external data source 322 accessible to the system via a network.

For example, external data source 322 can include one or more databases and/or applications configured to retrieve information from the one or more databases openly available and accessible over one or more networks 114. In an aspect, an external data source 322 can include a search engine that access information available over the Internet at various open source databases. The invitee analysis/inference component 202/318 can use the external search engine to find answers to invitee questions. For example, the analysis/inference component 202/318 can use the external search engine to look up directions to an event and provide. In another example, the analysis/inference component 202/318 can use the external search engine to look up information about parking at an event. The invitee answer component 304 can generate a message and send the message to the invite providing the requested information. For example, the invitee answer component 304 can send a message to the invitee with a link to a web resources providing the information.

In yet another aspect, the invitee response component 302 can determine that an invitee response to an event invitation requires the event management component 108 to communicate with the other invitees to answer an invitee's question or coordinate the invitees with respect various aspects of an event. For example, an invitee's response can prompt coordination with respect to traveling arrangements to the event, with respect to bringing material to the event, with respect to grouping invitees on performing roles at an event, and etc. According to this aspect, the event management component 108 can employ invitee coordination component 306 to coordinate invitees with respect to various details of an event that require intercommunication between attendees.

The event coordination component 306 facilitates efficient and productive communication between invitees based on one or more invitee responses. The event coordination component 306 acts as a middle man between invitees so that invitees do not need to communicate directly with one another. The event coordination component 306 also analyzes invitee messages and performs problem solving techniques to coordinate invitees. In an aspect, the event coordination component 306 generates and sends messages to other invitees on behalf of an invitee, intercepts responses to such messages, interprets the responses, and relays an interpreted response message to the invitee. Information about an event that surfaces as a product of invitee communication and coordination by coordination component 306 can further be provided to collation component 204 and sponsor report component 206 for collation and inclusion in an event update report.

For example, an invitee may respond to an event invitation with an indication that the invitee needs a ride to the event. The invite response component 302 can analyze the response and determine that the invitee response prompts a need for intercommunication between invitees. In turn, the invitee response component 302 can employ invitee coordination component 306 to facilitate generating and relaying messages between invitees. According to this example, the invitee response component 302 can employ the invitee coordination component 306 to facilitate communications between invitees to find the invitee a ride. For instance, the invitee coordination component 306 can generate and send a message to the other invitees indicating that "Tommy needs a ride to the Event," (e.g. via text, email, or voice mail as defined by event management protocol instructions or determined/inferred by analysis component 202). The message sent to the other invitees can allow the invitees to respond by offering to give Tommy a ride.

For example, the invitee coordination component 306 can generate a text message and send the text message to the other invitees. The text message can allow the other invitees to respond with a "Y" if they can give Tommy a ride. The invitee coordination component 306 can then analyze responses to the ride message sent by the invitees, (e.g. by employing analysis/inference component 202/318). The invitee coordination component 306 can then determine that Gina indicated that she can give Tommy a ride and by using an external resource 322 (e.g., an address look up service or a location finding service as discussed infra), the invitee coordination component 306 can determine that Gina is physically located closest to Tommy when compared to physical locations of the other invitees indicating that they can offer Tommy a ride. Accordingly, the invitee coordination component 306 can select Gina as the invitee to give Tommy a ride and generate and send messages to Gina and Tommy respectively indicating that they will be carpooling together and providing details to accomplish the carpooling (e.g. when and where Tommy will be picked up, what kind of car Gina drives, and etc.). In some aspects, the invitee coordination component 306 can provide the sponsor report component 206 with information noting that Tommy will be riding with Gina, for inclusion in an event update report.

In an aspect, the invitee coordination component 306 can communicate messages to invitees without revealing the invitee's respective contact information. In particular, because the invitee coordination component 306 intercepts messages sent from invitees, the invitees do not need to know other invitees personal contact information. In other words, the invitees do not need to communicate directly with other invitees using their respective contact information. On the contrary, the invitee only needs to be able to communicate with the event management server 102. However, in an aspect, personal communication between invitees can be requested by an invitee. According to this aspect, an invitee can submit a response to an additional message generated and sent by the event management server or an original event invitation sent by the event management server 102 requesting another invitee's personal information. The event management server 102, (e.g., via invitee coordination component 306) can the request authorization from the other invitee to reveal his or her personal contact information. If authorization is received, the invitee coordination component 306 can provide the requested information to the requesting invitee.

Invitee intelligence component 308, is configured to gather information about an invitee that can be employed by the event management server to efficiently manage a current event or future event. Such information can include but is not limited to, invitee preferences/needs, invitee associations, or invitee locations. For example, the invitee intelligence component 308 can monitor communications between the event management server 102 and an invitee to determine, using analysis/inference component 202/318, the communication techniques that are successful with the invitee. According to this example, the invitee intelligence component 308 may determine that invitee John responds to voice messages after 5 pm. In another example, the invitee intelligence component can learn that a particular invitee is a vegetarian or handicapped. Still, in yet another example, the invitee intelligence component can learn that Donna is always the announcer for a reoccurring event or that Sharron is affiliated with a prominent local sponsor. In some aspects, the invitee intelligence component 308 can employ external sources, such as social or business networking websites to gather information about an invitee. The invitee intelligence component 308 can further store gathered/determined/inferred information about an invitee in data store 320 and the event management server 102 can utilize the invitee intelligence information to effectively manage an event.

Event update component 310 is configured to communicate updates or changes to an event to invitees. In an aspect, the event update component 310 receives event updates/changes from an event sponsor and communicates the event updates/changes to the invitees. For example, an event sponsor can send a message, via sponsor device 116 with a change or update to an event. According to this example, the event sponsor may send a message to the event management server 102 indicating a change in venue to the event or a change in time. The event sponsor could also send a message to the event management server 102 providing additional information about the event (e.g. an article or media about the event). The event update component is configured to communicate event update information provided by sponsor to the invitees.

The event regulation component 312 is configured to monitor the progress of an event and provide information regarding the status of the progress of an event to invitees. In an aspect, status of an event relates to whether an event for which an invitation was sent will occur and when it will occur. For example, the invitee regulation component 312 can send messages to invitees on a programmed schedule indicating that they have confirmed attendance to an upcoming event and that the event is still scheduled to take place. A status update message could indicate that an event will take place in 2 hours or that an event is currently in progress.

In another aspect, the event regulation component 312 can regulate invitee acceptance of invitations to an event with registration requirements. For example, an event sponsor can indicate in an event request that acceptance of an event invitation is restricted to up until the day before the event. In another example, an event sponsor can indicate in an event request that acceptance of an event invitation is limited to the first 30 accepting invitees. According to this aspect, the event regulation component 312 can regulate expiration of an event invitation and send messages to non-responding invitees that acceptance/registration for an event is closed. Similarly, the event regulation component 312 can determine when a quota for accepting invitees has been met and send messages to the non-responding invitees indicating that acceptance/registration for the event is closed.

Event initiative component 314 is configured to make decisions regarding changes and updates and planning an event on behalf of a sponsor, based on information generated during the course of event management. In particular, the event initiative component 314 can employ information received by event management server from invitees and/or the sponsor as well as information generated by the event management server (e.g. invitee intelligence information), to determine or infer changes to an event or additions to an event. The event initiative can then automatically implement those changes/additions and/or include the changes/additions as suggestions to the event sponsor in an event update report. For example, the event initiative component 314 can suggest changing the time of an event based on invitee responses or suggest adding a wheel chair ramp to the entrance to an event hall based on learned handicap needs of an invitee.

The event summary and closing component 316 is configured to generate information summarizing an event after an event has taken place and communicate with invitees regarding retaining invitee information associated with the event. For example, the event summary component and closing component 316 can summarize the happenings of an event and provide the summary to invitees that were unable to attend the event (e.g., a "here is what you missed"

message). The event summary and closing component 316 can also provide such a report to invitees who attended the event and the sponsor.

The event summary and closing component 316 is also configured to tidy up affairs between the event sponsor and invitees regarding retaining information about an event for future use by the event management server. In particular, the event summary and closing component 316 can send messages to invitees following a completed event asking the invitees if they would like to remain on an invitee list for future events by a particular event sponsor, or future events related to a completed event. The invitees can then respond by asking to remain on the list or asking to be taken off the list. The event summary and closing component 316 can also send messages to an event sponsor following a completed event asking if the event sponsor would like to schedule another event using information from the completed event and/or if the sponsor would like to save information about a completed event for potential future use. The sponsor can respond to such messages and instruct the event management server 102 to schedule another event and/or save or delete event information.

Figure 4:
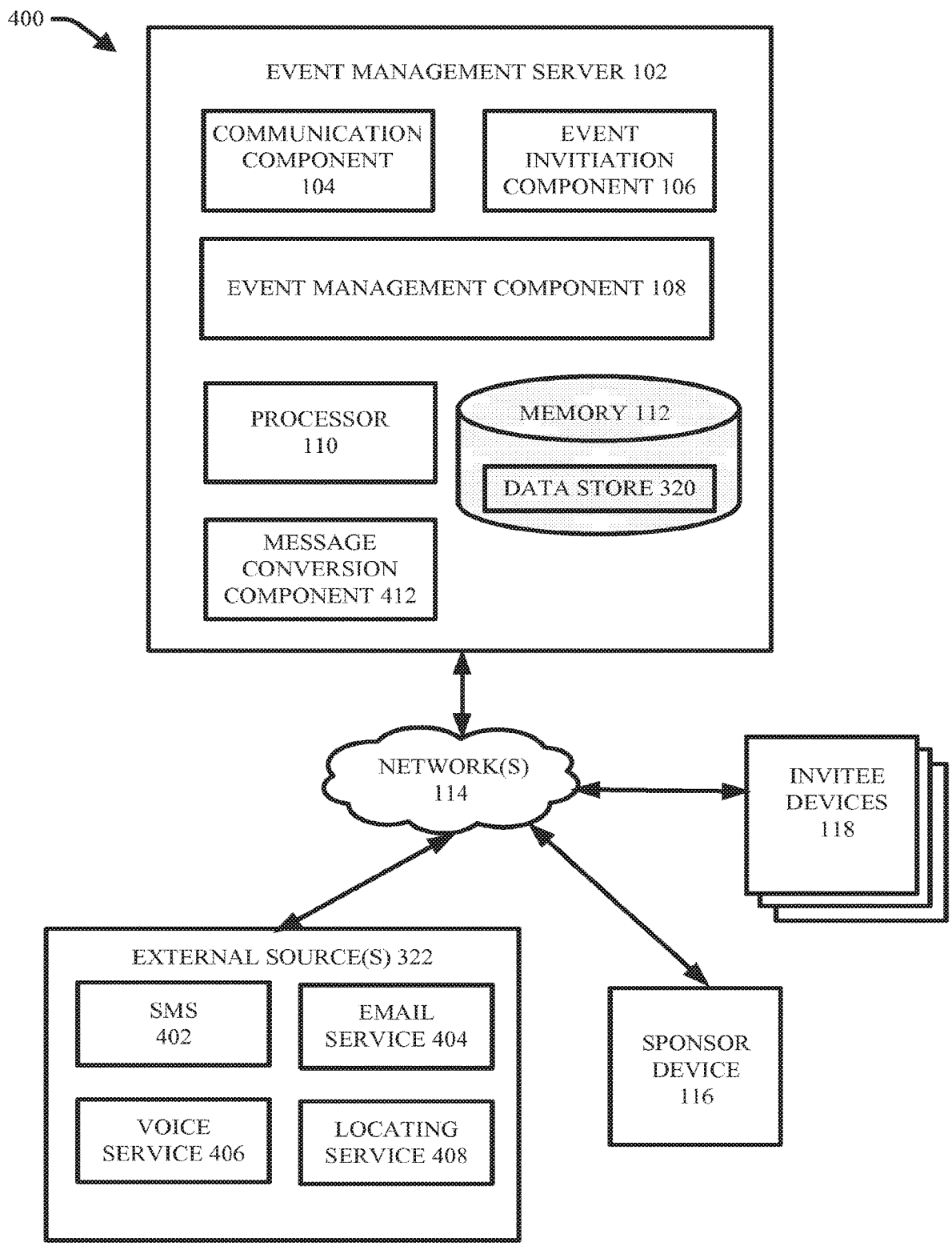
FIG. 4 illustrates a block diagram of another example system for scheduling and managing an event using a cloud based server, in accordance with various aspects and embodiments described herein.

FIG. 4 presents another system 400 for managing an event on behalf of an event sponsor in accordance with aspects described herein. FIG. 4 illustrates example networked external sources 322 that event management server 102 can employ to facilitate various event management and planning operations described herein. Repetitive description of like elements employed in respective embodiments of systems and devices described herein are omitted for sake of brevity.

As noted supra, event management server 102 employs communication component 104 to communicate messages to and from a sponsor and invitees. In an embodiment, sponsors and/or invitees communicate with the event management server 102 using test messaging. According to this aspect, the event management server 102 can employ a subscriber messaging service (SMS) 402 accessible via an external network 114 (e.g. a cellular network) to communicate text messages to and from a sponsor device and/or an invitee device. In an aspect, after the event invitation component generates an event invitation, the event invitation component provides the event invitation to the communication component for sending as a text message to the invitees. The communication component 104 can then request that the SMS 402 generate and send the event invitation as a text message to the invitees on behalf of the event management server 102.

In an aspect, in order to send the event invitation as a text message, the communication component requests that the event invitation is sent to the invitees using a wireless number assigned to the event management server 102. An invitee can further communicate back to the event management server using the wireless number. However, in another aspect, the communication component 104 can request that the SMS 402 send the text message event invitation using a short code or a non-wireless number associated with the event management sever and/or an event. By employing a short code or a non-wireless number, the event management server 102 can receive messages sent by an invitee to the event management server 102 using the short code or non-wireless number. In other words, by employing a short code or non-wireless number, the event management server 102 can intercept any messages sent from invitees as responses to an event management server message.

In an aspect, the event management server 102 can employ a single non-wireless number or short code for all the events it schedules and manages, including multiple different events from a single sponsor or multiple different events from multiple different sponsors. According to this aspect, the non-wireless number or short code can be shared across multiple events/sponsors because the invitee mobile numbers are unique. In cases where an invitee has more than one active event invitation, the event management server can identify an event within the body of a text message or inquire with the invitee about which event he or she is responding too. However, in another aspect, the event management server 102 can employ request the SMS 402 assign different non-wireless numbers or short codes for the different events it schedules and manages By using text messaging as mechanism to communicate with invitees, the event management server 102 can make responding to event invitations and other messages from the event management server simple and efficient for the invitees. For example, the event management server can establish a communication protocol whereby a text message can instruct an invitee to respond with simple codes representing responses. For example the event management server can configure a message such that if a "W" is received from the invitee, it would initiate a location request for the invitee from a locating service 408 subscribed to by the event management server. The locating service 408, could then perform a location look up on the event address to and instruct the invitee how to get to the event location. In another example, the event management server can configure a message such that if an "X" is received, the event management server will remove an invitee from the invitee list. Still in another example, the event management server can configure a message such that if a "C" is received, an invitee indicates a desire to form a car pool to the event. According to this example, the invitee coordination component 306 can configure a text message for sending to the other invitees stating "John Smith needs a ride to Practice, can you help? Y/N." Paul Jones may then respond to the message indicating "Y, I can pick him up at the School at 5:00." The invitee coordination component can then configure a message to send back to John Smith stating "Paul Jones can pick you up at the school at 5:00, is that OK Y/N?". A response of Y by John Smith resulting in the invitee coordination component sending a confirmation back to Paul Jones, and so on.

In another embodiment, the communication component 104 can employ an email service 404 to communicate messages to and from invitees and sponsors. According to this embodiment, the event management server 102 can employ an email service/server 404 accessible via an external network 114 (e.g. an internet protocol (IP) based network) to communicate emails to and from a sponsor device and/or an invitee device. In an aspect, after the event invitation component generates an event invitation, the event invitation component provides the event invitation to the communication component for sending as an email to the invitees. The communication component 104 can then request that the email service 404 generate and send the event invitation as an email to the invitees on behalf of the event management server 102. In an aspect, in order to send the event invitation as an email, the communication component 104 requests that the event invitation is sent using an email address assigned to the event management server 102. According to this aspect, in order to communicate with the event management server, a sponsor or an invitee can direct emails to the email address assigned to the event management server. In an aspect, in order to send the event invitation as an email, the communication component 104 requests that the event invitation is sent using an email address assigned to a particular event or a particular event sponsor.

As noted supra, the when relaying/coordinating messages between invitees, the event management server 102 can retain private contact information for the invitees. For example, the event management server can associate an invitee name or ID with a cellular number or email address. When configuring a message to send to an invitee on behalf of another invitee or identifying the other invitee (e.g. Paul Jones and John Smith in the example above), the event management server can merely reveal invitee name or IDs while keeping their contact information private.

Voice service 406 can be employed be event management server to communicate voice messages between event management server 102 and invitees. In an aspect, the event management server can employ a message conversion component 412 to convert voice to text and vice versa. For example, where an invitee device has the capability of recording or relaying voice messages, the invitee device can respond to a message sent from the event management server with a voice message. The invitee can then send the voice message to the event management server 102 via the voice service 406 and the event management server can interpret and convert the voice message to text. In another aspect, the event management component can employ message conversion component 412 to generate a voice message (e.g. a voice message reading an event invitation or other message) and employ voice service 406 to communicate the voice message to an invitee as a telephone call. In other aspects, voice service 406 can employ text to speech software and convert messages sent from the event management server to voice messages to be sent to invitee devices as phone calls having a recorded voice message. By employing voice capabilities, event management server can send recorded messages (e.g. announcement, directives, and etc. on behalf of an event sponsor and/or provided by the event sponsor. For example, an event sponsor may direct, via event management protocol instructions, the event management server 102 to send reminder phone calls soliciting attendance to an event (e.g., as a form of escalation when no text response is received).

Locating service 408 is configured to provide locating based services to event management component. In particular, in various aspects, the event management server may desire to know a current physical location of an invitee. For example, the event management server may desire to know locations of invitees 15 minutes prior to the start of an event to determine if the invitees will arrive to the event on time. For instance, an event sponsor can send a message to the event management server 102 requesting an update on the locations of invitees. According to this example, the event management server 102 can employ locating service 408 to locate an invitee (e.g. using global positioning system (GPS) methods, assisted GPS (AGPS), time based locating methods, multilateration, or any other mobile device tracking methods). The event management server 102 can then generate an event update message indicating the locations of the invitees, as determined by the locating service 408, and provide the event update message to the event sponsor.

In another example, event management protocol instructions (provided by an event sponsor or originating with event management system 102), can include location triggers to that track how invitees are reaching an event destination. The event management system can employ locating service 408 to execute such location trigger aspects of system 400. For example, the event management server 102 can updates the sponsor on how attendees are progressing toward the event. The event management server 102 can further contact those not making progress to ask them how long it will be until they arrive. For example, the event management server can contact attendees who are not located within 20 miles of the event location 30 minutes before the event is to begin by sending them a text message asking those attendees their estimated time of arrival.

Figure 5:
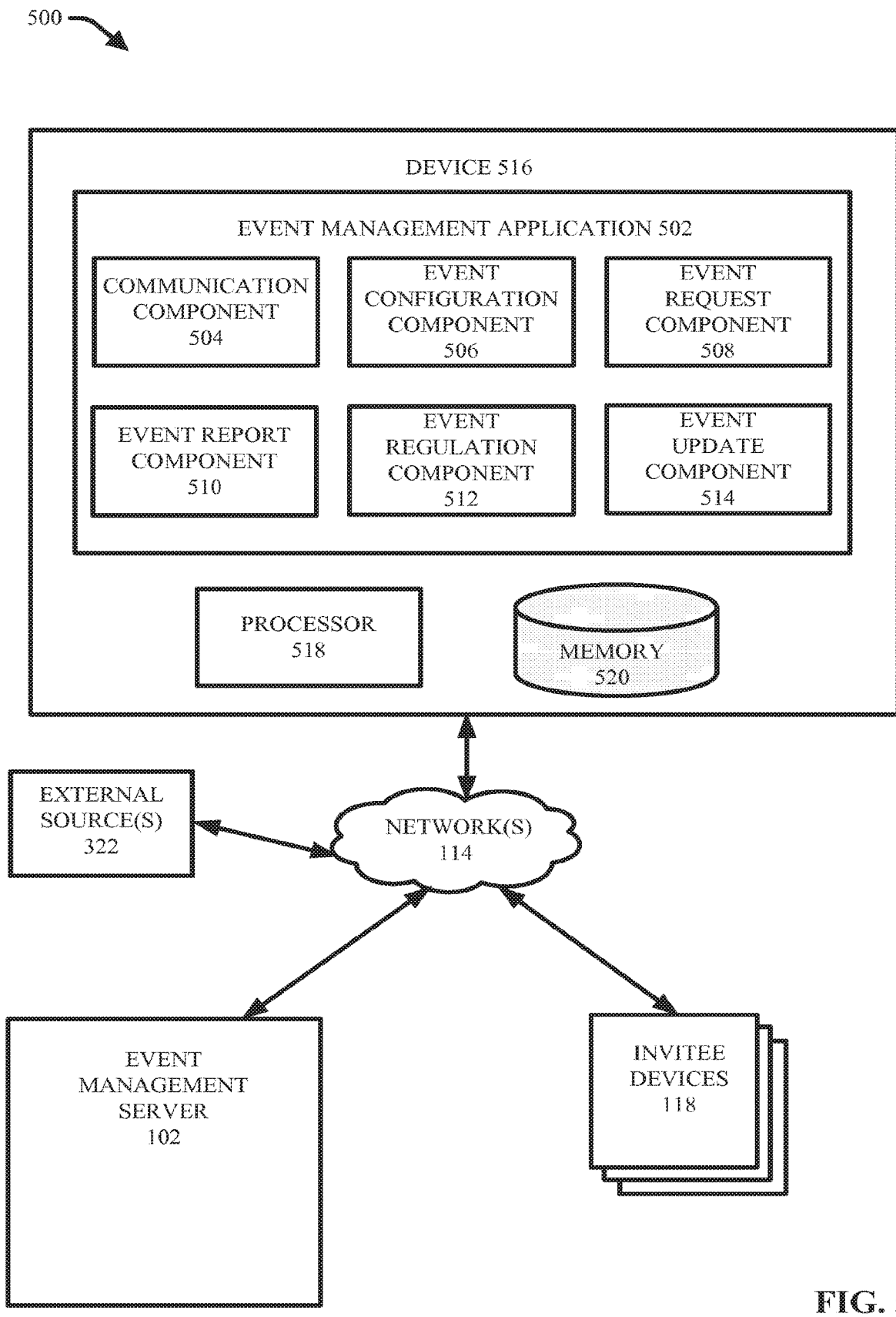
FIG. 5 illustrates a block diagram of an example system for scheduling and managing an event using a cloud based server and an application accessible to a sponsor device, in accordance with various aspects and embodiments described herein.

Turing now to FIG. 5 presented is an example system 500 for scheduling and managing an event using a cloud based server and an application accessible to a sponsor device, in accordance with various aspects and embodiments described herein. Repetitive description of like elements employed in respective embodiments of systems and devices described herein are omitted for sake of brevity.

System 500 includes a device 516 (e.g. a sponsor device or other networked device) that includes an event management application 502. Device 516 includes memory 520 for storing instructions (e.g., computer executable components and instructions). Device 516 further includes a processor 518 to facilitate operation of the instructions (e.g., computer executable components and instructions) by device 516. System 500 exemplifies components of an event management application 502 that can be employed by an event sponsor device to schedule and manage an event using event management server 102. In various aspects, application 502 is a software system that can be executed using various computer readable mediums and in various formats.

In an aspect, application 502 is a software application designed to run on a smartphone, tablet computers or other mobile device. According to this aspect, device 516 is a sponsor device (e.g. a sponsor device 116) and application 502 is configured to communicate information with the event management server over a network 114 (e.g. a cellular network or IP based network). In another aspect, event management application 502 is configured to run on a device 516 external to a sponsor device (not shown) and be accessed by the sponsor device via one or more networks 114 (e.g. WAN or LAN network). According to this aspect, application 502 can function as a website that can be accessed by sponsor device 116 using a web browser.

Event management application 502 can include communication component 504, event configuration component 506, event request component 508, event report component 510, event regulation component 512 and event update component. Event configuration component 506 is configured to facilitate the configuration of an event request. In particular, event configuration component 506 allows a sponsor do design an event request having information about the event that can be employed by event management server 102 to schedule and manage an event. For example, a sponsor can employ event configuration component to configure an event request having a description of the event, invitees to the event, and contact information for the invitees (e.g. names, email addresses, and/or phone numbers). The description of the event can include basic information about the event such as what the event is (e.g. a soccer practice), and time date and location of the event.

Event configuration component 506 however can allow a sponsor to configure an event request with a wealth of information about an event as described herein. For example, the event configuration component 506 can provide a template that allows a sponsor to fill out an event profile with detailed information about the event, provide links and media attachments related to an event, and define event management protocol instructions that direct the event management server 102 how to perform its' management and scheduling functions. For example, the event configuration component 506 can allow a sponsor to choose the mechanisms for communication between the sponsor and/or the invitees. In another example, an when configuring an event request, an event sponsor can implement instructions that direct the event management server to delay the sending of an event invitation until a specified time and date, direct the event management server to send event reminders on a defined schedule, direct the event management server to implement an escalation scheme whereby the event management server interrogates an invitee with various forms of communication and messages until a response is received, direct the event management server to use locating services to track the progress of invitees to an event, and etc.

In an aspect, the event configuration component 506 can employ multiple event request templates that facilitate configuring an event based on event type. For example, different event templates can be provided for different types of events including but not limited to: a meeting, a party, a dinner gathering, a sports match, a sports practice, a band practice, or a group vacation. An event can include any conceivable function where a group of people come together at a predefined date, time and/or place. According to this event, when configuring an event request, a sponsor can select the type of event he or she is scheduling. In turn, the event configuration component can present the sponsor with a template that facilitates configuring an event request for that type of event.

In another aspect, in order to facilitate configuring an event, the event configuration component can employ previous event requests implemented by a sponsor. Such previous event requests can be stored in memory 520 or in a remote data store accessible to the event management application 502. According to this aspect, the event configuration component 506 can allow a sponsor to employ a previous event request to facilitate generating a new event request. For example, a sponsor may desire to employ a previous event request to reschedule an event that is reoccurring and/or to schedule an event that involves a same or similar group of invitees.

For example, a sponsor may have scheduled a party for Halloween in the past. The sponsor can employ event management server 102 to schedule and manage a new party for New Years Eve. The event sponsor may want to employ some or all of the requirements and/or information used in the past from the Halloween party when scheduling the New Years Eve party. For example, the event sponsor may want to invite the same people and implement the same event management protocol used for the Halloween party. Rather than create a new event request from scratch, the even configuration component 506 can allow the sponsor to retrieve the information from the previous event request and modify the information as necessary to accommodate the new event.

After an event sponsor has employed event configuration component 506 to configure an event request, the event request component 508 takes over and generates an event request using the information provided by the event sponsor when configuring the event. The event request component 508 then sends the event request to the event management server using the communication component 504.

Communication component 504 is configured to communicate information between the event management application 502 and the event management server 102 over the one or more networks. In an aspect, communication component communicates information to and from application 502 and event management server 102 using hypertext transfer protocol (HTTP) when the application 502 is connected to the one or more networks 114. For example, the communication component 504 can send an event request to the event management server 102 using HTTP. The event request can further be interpreted and processed by the event management server 102 in the manners discussed herein. According to this aspect, the event management server 102 can function in part as a web server.

In another aspect, the communication component 504 communicates information to and from the event management server 102 as a text message or phone call. For example, the communication component 504 can send event requests, event update messages/requests, and other types of communication between the event management server 102 and the even management application 502 (and/or device 516 at which the event management application is run) as a text message or voice call. In other aspects, the communication component 504 communicates information to and/from the event management server using email messaging. According to this aspect, the application 502 and the event management server can employ external sources 322 to facilitate transferring communications, (e.g. a cellular networks SMS API, email servers and etc.).

The communication component 504 can further employ mixed communication techniques to communicate information to and from the event management application 502 and/or device 516 (e.g. a sponsor device). In an aspect, the event management application 502 can communicate an event request or event update request using HTTP. The event management application 502 can further receive event update reports as an email message, text message or phone call with a recorded voice message. According to this aspect, the event management application 502 can be employed by an event sponsor to configure an event request and schedule an event. When configuring the event request, the event sponsor can select how he would like to receive updates from the event management server and communicate changes to the event in the future. For example, the event sponsor can provide the event management server 102 with event management protocol instructions that instruct the event management server to provide the event sponsor with event update reports as text messages to his sponsor device. The event sponsor can further communicate changes to an event using text messaging via his sponsor device. For example, the sponsor can send a response to an event update report received as a text message via a short code back to the event management server 102 using the short code.

Event report component 510 is configured to receive event update reports from the event management server 102 and present the event update reports to the event sponsor. For example, the event report component 510 can receive an event update report that includes collated information indicating what invitees are attending the event, what invitees have declined attendance, and what invitees have not responded to an event invitation. In another example, an event update report 510 can summarize questions raised by invitees that the event management server was unable to answer. Still in yet another aspect, the event update report 510 can inform a sponsor what the invitees will be bringing to an event, how the invitees are arriving to the event, or food selections for the event. It should be appreciated that an event update report can include a wide variety of information that is gathered from invitees and processed by the event management server 102.

Event regulation component 512 is configured send updates regarding the status of an event in progress to the event management server for communication to invitees. In an aspect, the event regulation component 512 sends status updates regarding the status of an event without involvement of an event sponsor. For example, the event regulation component 512 can send automatically send status updates indicating the invitees who will be attending the event, indicating that event registration will be closing in an hour, indicating that event registration is open or closed, indicating that the event will take place in 24 hours, and etc. In other aspects, the event regulation component 512 can send event status updates in response to a request by the event sponsor.

Event update component 514 is configured to send event updates to the event management server 102 for processing thereof and/or communication to one or more invitees. For example, event update component 514 can be employed by a sponsor to make changes to an event. According to this example, the event sponsor can employ event update component to change a time, date or location of an event. In another example, the event update component 514 can be employed by an event sponsor to provide invitees new information about an event. For example, an event sponsor may want to inform invitees that a guest speaker will be attending the event or that the event now has a beach party theme. The event sponsor can employ event update component 514 to generate an event update with information about an event in progress. The event update component 514 sends the event update to the event management server 102. In turn the event management server can communicate the information to invitees in a convenient and efficient manner.

In view of the example systems and/or devices described herein, example methods that can be implemented in accordance with the disclosed subject matter can be further appreciated with reference to flowcharts in FIGS. 6-9. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 6:
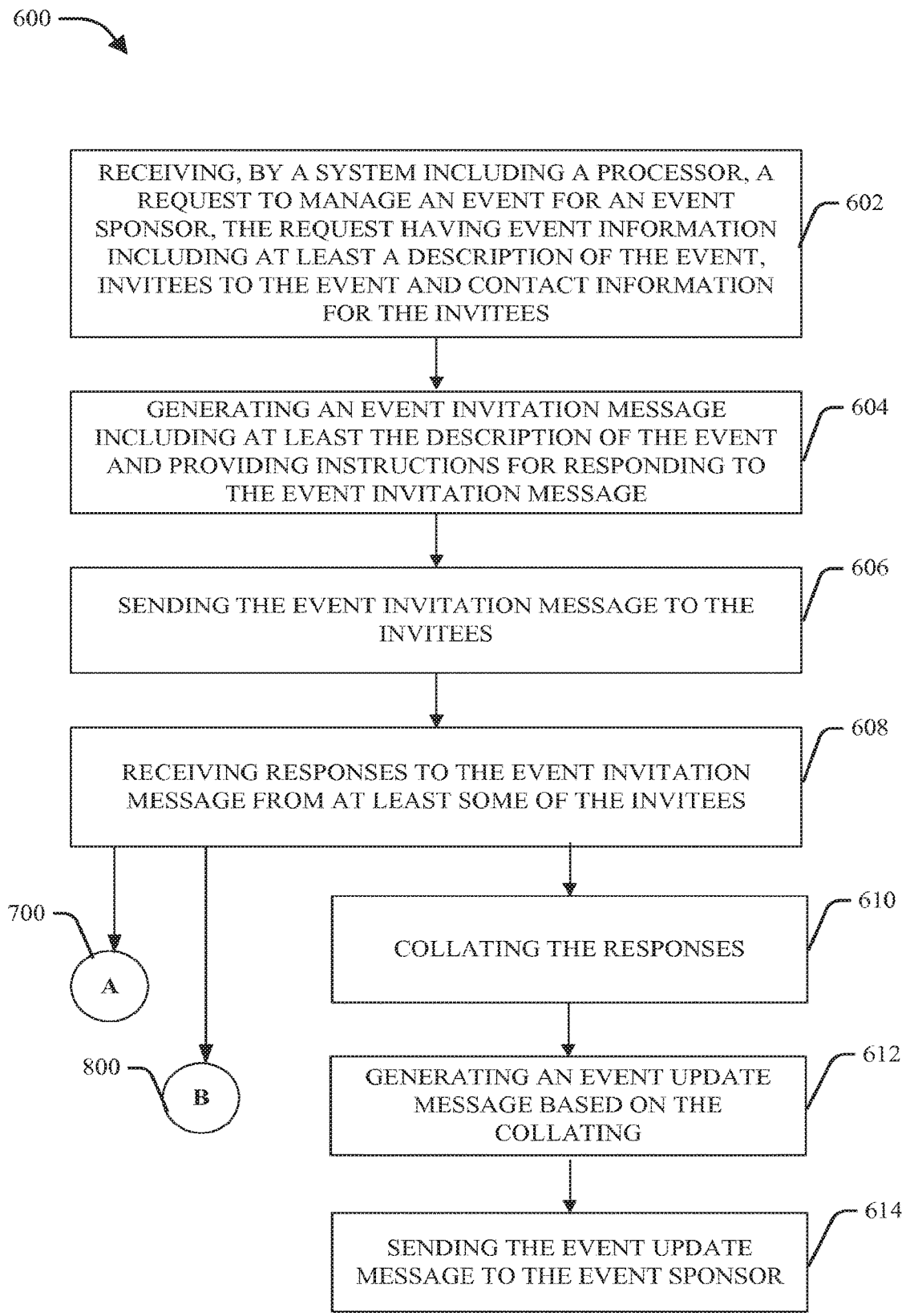
FIG. 6 is a flow diagram of an example method for scheduling and managing an event using a cloud based server, in accordance with an aspect of the disclosed subject matter.

FIG. 6 illustrates a flow chart of an example method 600 for scheduling and managing an event using a cloud based server in accordance with aspects described herein. At 602, a request is received, by a system including a processor, to manage an event for an event sponsor, the request having event information including at least a description of the event, invitees to the event and contact information for the invitees. At 604, an event invitation message is generated that includes at least the description of the event and provides instructions for responding to the event invitation message. At 606, the event invitation message is sent to the invitees. At 608, responses to the event invitation message are received from at least some of the invitees. After a response is received from an invitee at 608, method 600 can proceed in various directions. For example, direction A is described with reference to method 700 in FIG. 7 and direction B is described with reference to method 800 in FIG. 8. It should be appreciated that directions A and B are merely provided as possible directions of method 600 and are merely exemplary. The event management server can proceed to process invitee responses in a wide capacity as described herein.

At 610, the responses are collated and at 612 an event update message is generated based on the collating the responses. For example, the event update message can summarize the invitees that have accepted the event invitation and the invitees that did not accept the event invitation. In another example, the event update message can include collated questions received from the invitees. Still in yet another aspect, the event update message can include information summarizing a product of invitee intercommunication as facilitated by the system. At 614, the event update message is sent to the event sponsor.

Figure 7:
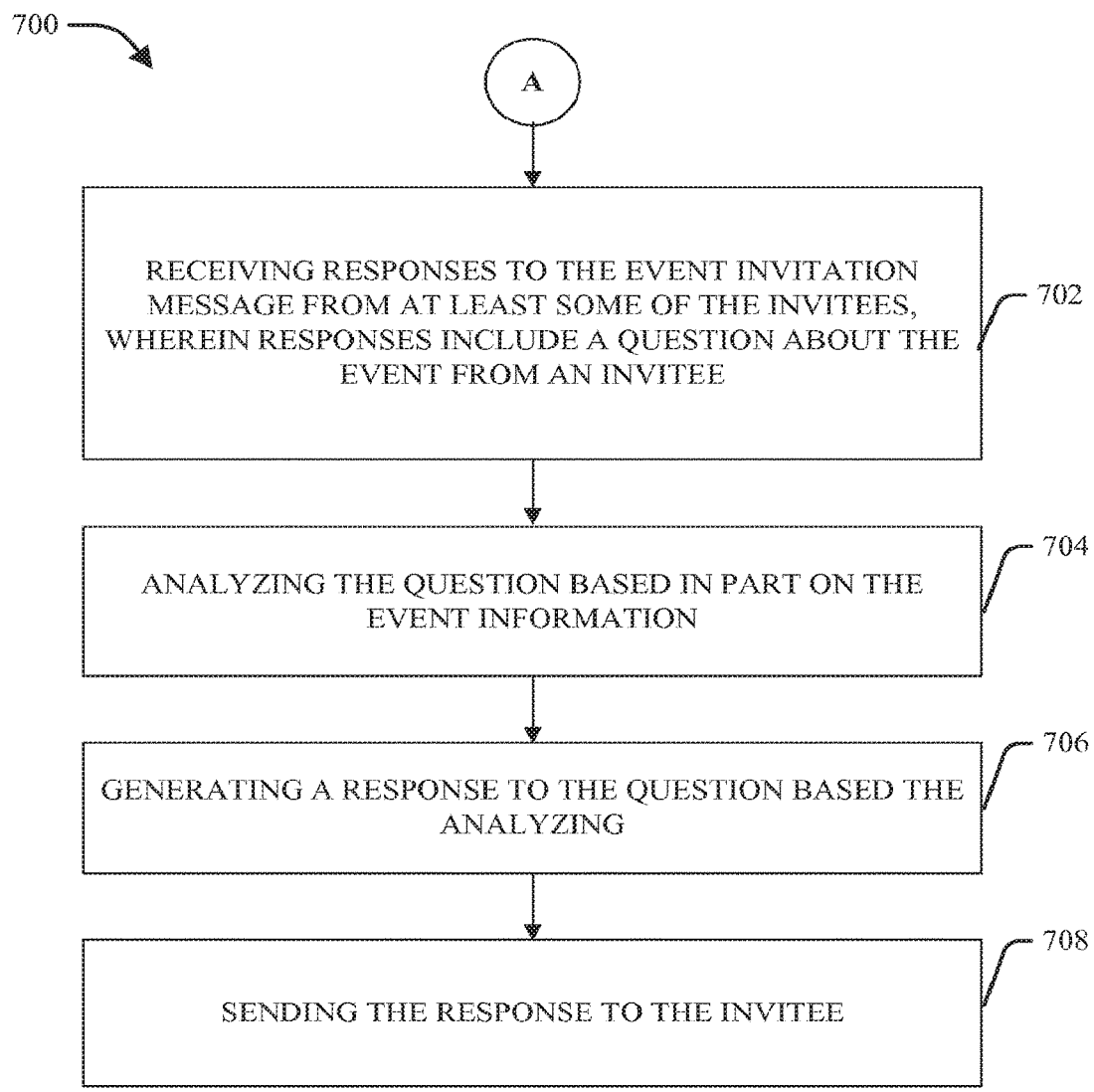
FIG. 7 is a flow diagram of another example method for scheduling and managing an event using a cloud based server, in accordance with an aspect of the disclosed subject matter.

Referring next to FIG. 7, depicted is another flow chart of an example method 700 for managing an event on behalf of an event sponsor using a cloud based server. Method 700 extends from direction A associated with method 600. At 702, responses to the event invitation message are received from at least some of the invitees. The responses include a question about the event from an invitee. At 704, the question is analyzed based in part on the event information provided by the sponsor in the event request. In other aspects, the question can be analyzed using information stored and gathered by the system, using other invitee responses, and/or using one or more external resources. At 706, a response to the question is generated based on the analyzing. At 708, the response is sent to the invitee.

Figure 8:
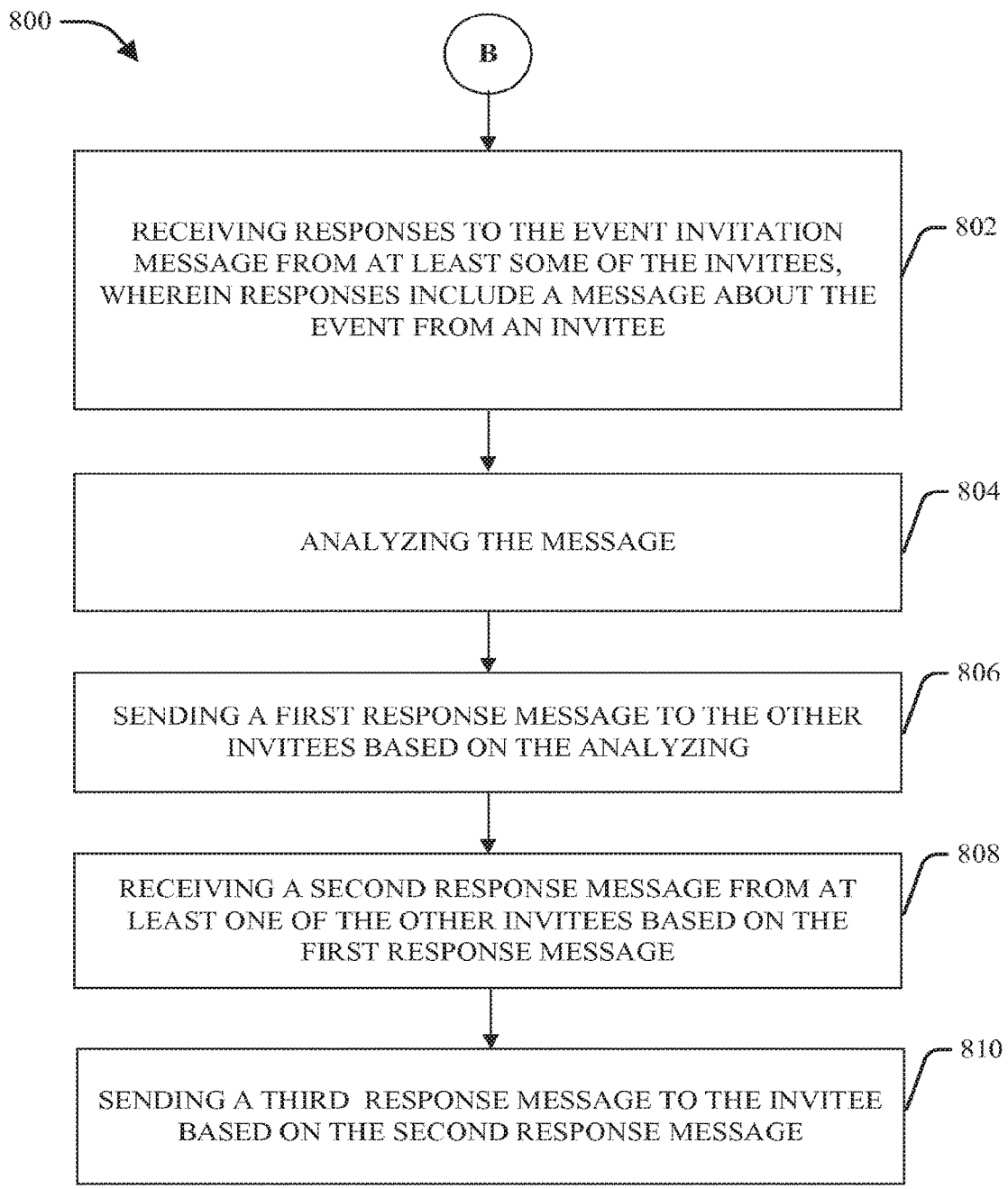
FIG. 8 is a flow diagram of another example method for scheduling and managing an event using a cloud based server, in accordance with an aspect of the disclosed subject matter.

FIG. 8, depicts another flow chart of an example method 800 for managing an event on behalf of an event sponsor using a cloud based server. Method 800 extends from direction B associated with method 600. At 802, responses to the event invitation message are received from at least some of the invitees. The responses include a message about the event from an invitee. At 704, the message is analyzed. For example, the invitee response component 302 can determine whether the message prompts additional action by the system. According to this example, the message may state that invitee John would like to perform the announcing at the event. The invitee response component 302 can determine that approval by the other invitees is needed prior to informing John that he will be performing the announcing at the event. At 806, a first response message is sent to the other invitees based on the analyzing. In furtherance to the above example, the first response message may state that "John want to announce at the event, do you approve? text Y for yes you approve or N for no you don't approve." At 808, a second response is received from at least one of the other invitees based on the first response message. For example, the second response message can include a "Yes" from Amy indicating that she approves of John announcing.

In an aspect, the system can tally up all the received responses (e.g. using collation component 104) and if everyone approves, the system can send John a message indicating he will be announcing at the event. In accordance with method 800, at 810 this would include sending a third response message to the invitee based on the second response message. In other aspects, however, the system could collate second responses and provide the information to the event sponsor in an event update message. Later, the event sponsor may send an event update message to the system indicating that he approves of John announcing and instruct the system to send the event update message to John and/or all of the invitees.

Figure 9:
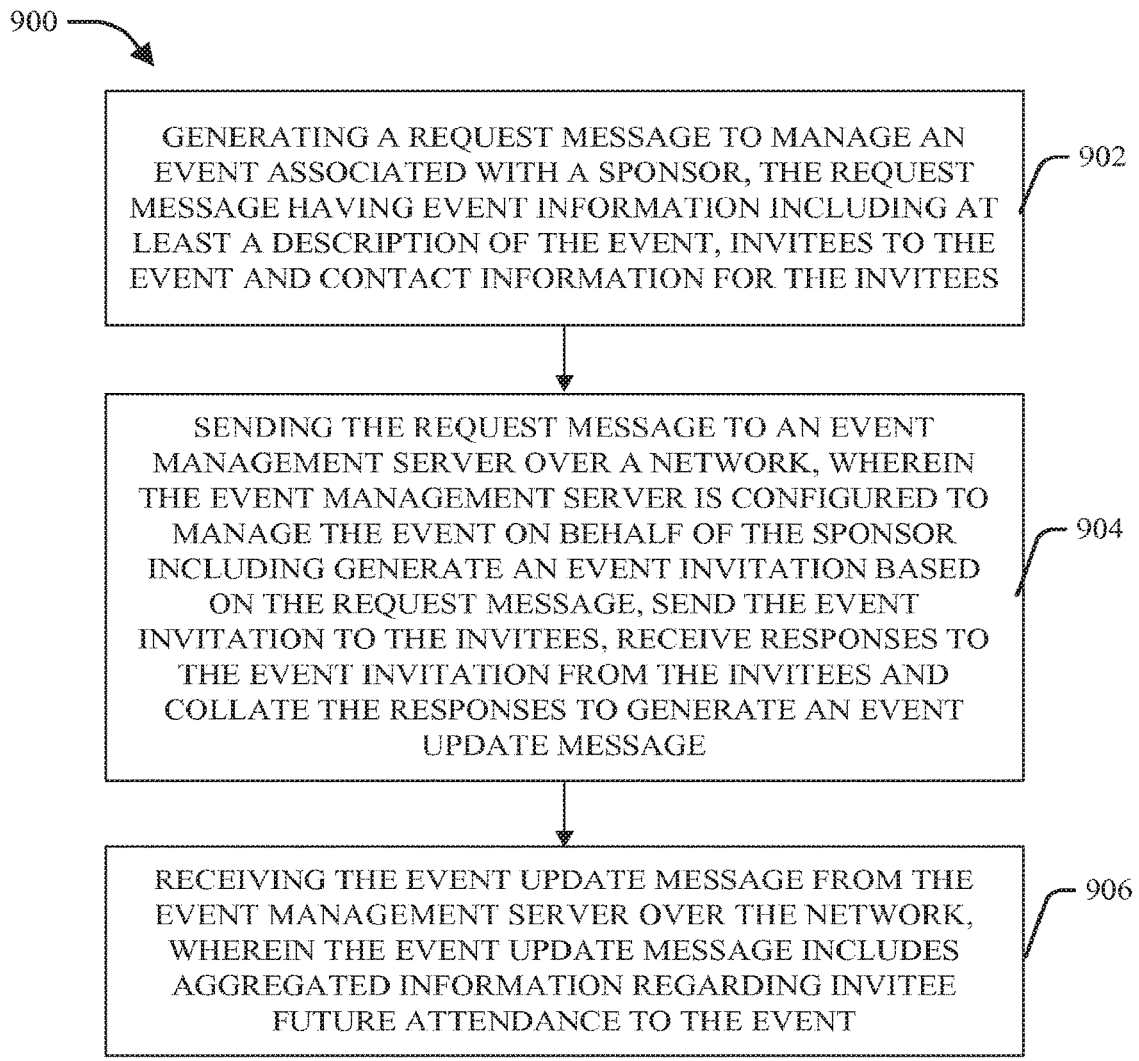
FIG. 9 is a flow diagram of another example method for scheduling and managing an event using a cloud based server, in accordance with an aspect of the disclosed subject matter.

FIG. 9 presents another flow chart of an example method 900 for managing an event on behalf of an event sponsor using a cloud based server. Method 900 demonstrate a method carried out by a sponsor device that interacts with an event management system. At 902 a request message is generated to manage an event associated with a sponsor, the request message having event information including at least a description of the event, invitees to the event and contact information for the invitees. At 904, the request message is sent to an event management server over a network, wherein the event management server is configured to manage the event on behalf of the sponsor including generate an event invitation based on the request message, send the event invitation to the invitees, receive responses to the event invitation from the invitees and collate the responses to generate an event update message. At 906, the event update message is received from the event management server over the network, wherein the event update message includes aggregated information regarding invitee future attendance to the event.

Figure 10:
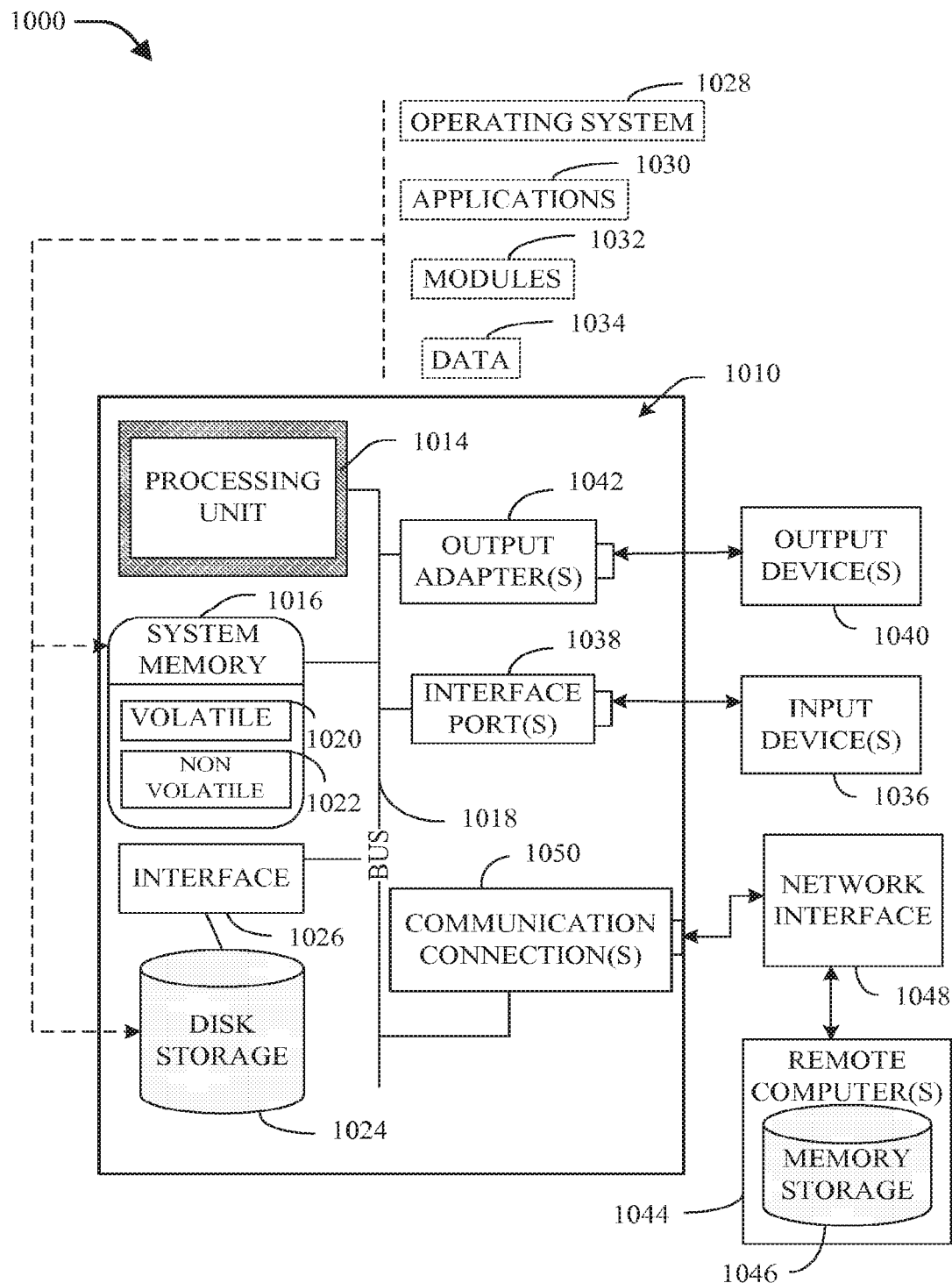
FIG. 10 is a schematic block diagram illustrating a suitable operating environment in accordance with various aspects and embodiments.
Figure 11:
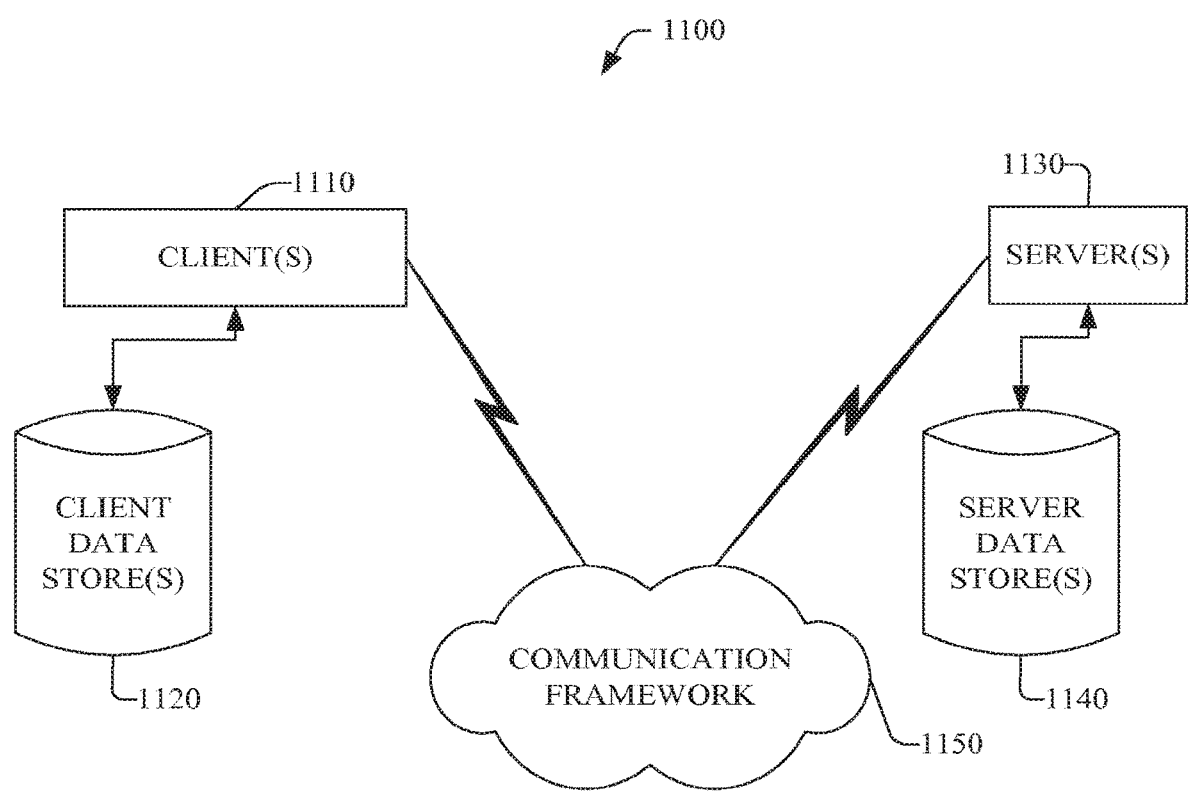
FIG. 11 is a schematic block diagram of a sample-computing environment in accordance with various aspects and embodiments.

FIGS. 10 and 11 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone, electronic tablets or pads, etc.), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

With reference to FIG. 10, a suitable environment 1000 for implementing various aspects of this disclosure includes a computer 1012. The computer 1012 includes a processing unit 1014, a system memory 1016, and a system bus 1018. It is to be appreciated that the computer 1012 can be used in connection with implementing one or more of the systems or components shown and described in connection with FIGS. 1-7, or otherwise described herein. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1010, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1010 also includes removable/non-removable, volatile/non-volatile computer storage media. FIG. 10 illustrates, for example, a disk storage 1024. Disk storage 1024 includes, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used, such as interface 1026.

FIG. 10 also depicts software that acts as an intermediary between users and the basic computer resources described in the suitable operating environment 1000. Such software includes, for example, an operating system 1028. Operating system 1028, which can be stored on disk storage 1024, acts to control and allocate resources of the computer system 1010. System applications 1030 take advantage of the management of resources by operating system 1028 through program modules 1032 and program data 1034 stored, e.g., in system memory 1016 or on disk storage 1024. It is to be appreciated that this disclosure can be implemented with various operating systems or combinations of operating systems.

A user enters commands or information into the computer 1010 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1010, and to output information from computer 1010 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1010 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1010. For purposes of brevity, only a memory storage device 1046 is illustrated with remote computer(s) 1044. Remote computer(s) 1044 is logically connected to computer 1010 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1010, it can also be external to computer 1010. The hardware/software necessary for connection to the network interface 1048 includes, for exemplary purposes only, internal and external technologies such as, modems including regular telephone grade modems, cable modems and DSL modems, ISDN adapters, and Ethernet cards.

FIG. 11 is a schematic block diagram of a sample-computing environment 1100 (e.g., computing system) with which the subject matter of this disclosure can interact. The system 1100 includes one or more client(s) 1110. The client(s) 1110 can be hardware and/or software (e.g., threads, processes, computing devices). The system 1100 also includes one or more server(s) 1130. Thus, system 1100 can correspond to a two-tier client server model or a multi-tier model (e.g., client, middle tier server, data server), amongst other models. The server(s) 1130 can also be hardware and/or software (e.g., threads, processes, computing devices). The servers 1130 can house threads to perform transformations by employing this disclosure, for example. One possible communication between a client 1110 and a server 1130 may be in the form of a data packet transmitted between two or more computer processes.

The system 1100 includes a communication framework 1150 that can be employed to facilitate communications between the client(s) 1110 and the server(s) 1130. The client(s) 1110 are operatively connected to one or more client data store(s) 1120 that can be employed to store information local to the client(s) 1110. Similarly, the server(s) 1130 are operatively connected to one or more server data store(s) 1140 that can be employed to store information local to the servers 1130.

It is to be noted that aspects, features, and/or advantages of the disclosed subject matter can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as Internet protocol television (IPTV), etc.) can exploit aspects or features described herein.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or non-volatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions, wherein the processor can directly perform operations, and/or the processor can indirectly perform operations, for example, by directing or controlling one or more other components to perform operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component", "system", "platform", "framework", "layer", "interface", "agent", and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment" (UE), "mobile station," "mobile," "wireless device," "wireless communication device," "subscriber station," "subscriber equipment," "access terminal," "terminal," "handset," and similar terminology are used herein to refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point" (AP), "base station," "Node B," "Evolved Node B" (eNode B or eNB), "Home Node B" (HNB), "home access point" (HAP), and the like are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "owner," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., communication device, UE, AP, communication network, application, transition management component, etc.), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
    generating, by a server, event invitation messages, the event invitation messages including description information representative of descriptions of an event, the description information including an event time;
    sending, by the server, the event invitation messages to respective devices associated with invitee identities invited to the event;
    gathering, by the server, information about the invitee identities, the information comprising one or more responses received from respective devices of the invitee identities in response to the event invitation messages, wherein each of the one or more responses received from respective devices of the invitee identities indicates whether the invitee identity will attend the event and is associated with a communication technique;
    determining, by the server, at the event time, whether one or more of the invitee identities that indicated attendance at the event are absent;
    determining, by the server, for an absent invitee identity, a current location of the absent invitee identity, comprising:
        determining a current location of a respective mobile device of the absent invitee identity using a global positioning system;
    generating, by the server, a probability distribution over states of interest for a plurality of communication techniques based on the gathered information;
    inferring, by the server, based at least in part on the probability distribution, a preferred communication technique of the plurality of communication techniques for the absent invitee identity;
    sending, by the server, a second message to the absent invitee identity using the preferred communication technique, wherein the second messages comprises a request for an estimated arrival time;
    generating, by the server, an event report comprising the determined current location of the absent invitee identity; and
    sending, by the server, to an event manager, the event report.

2. The method of claim 1, wherein the communication type is a telephone call, a text message, or an email.

3. The method of claim 1, wherein gathering information about the invitee identities further comprises monitoring, by the server, communications between the server and the respective devices of the invitee identities.

4. The method of claim 1, wherein gathering information about the invitee identities further comprises receiving information from sources external to the server.

5. The method of claim 1, wherein each of the one or more responses comprises a time of day.

6. A non-transitory computer-readable storage medium storing computer program instructions executable by one or more processors to perform operations, the operations comprising:
    generating, by a server, event invitation messages, the event invitation messages including description information representative of descriptions of an event, the description information including an event time;
    sending, by the server, the event invitation messages to respective devices associated with invitee identities invited to the event;
    gathering, by the server, information about the invitee identities, the information comprising one or more responses received from respective devices of the invitee identities in response to the event invitation messages, wherein each of the one or more responses received from respective devices of the invitee identities indicates whether the invitee identity will attend the event and is associated with a communication technique;
    determining, by the server, at the event time, whether one or more of the invitee identities that indicated attendance at the event are absent;
    determining, by the server, for an absent invitee identity, a current location of the absent invitee identity, comprising:
        determining a current location of a respective mobile device of the absent invitee identity using a global positioning system;
    generating, by the server, a probability distribution over states of interest for a plurality of communication techniques based on the gathered information;
    inferring, by the server, based at least in part on the probability distribution, a preferred communication technique of the plurality of communication techniques for the absent invitee identity;
    sending, by the server, a second message to the absent invitee identity using the preferred communication technique, wherein the second messages comprises a request for an estimated arrival time;
    generating, by the server, an event report comprising the determined current location of the absent invitee identity; and
    sending, by the server, to an event manager, the event report.

7. The non-transitory computer-readable storage medium of claim 6, the communication type is a telephone call, a text message, or an email.

8. The non-transitory computer-readable storage medium of claim 6, wherein gathering information about the invitee identities further comprises monitoring, by the server, communications between the server and the respective devices of the invitee identities.

9. The non-transitory computer-readable storage medium of claim 6, wherein gathering information about the invitee identities further comprises receiving information from sources external to the server.

10. The non-transitory computer-readable storage medium of claim 6, wherein each of the one or more responses comprises a time of day.

11. A system, comprising:
a processor; and
a non-transitory computer-readable storage medium storing computer program instructions executable by one or more processors to perform operations, the operations comprising:
generating, by a server, event invitation messages, the event invitation messages including description information representative of descriptions of an event, the description information including an event time;
sending, by the server, the event invitation messages to respective devices associated with invitee identities invited to the event;
gathering, by the server, information about the invitee identities, the information comprising one or more responses received from respective devices of the invitee identities in response to the event invitation messages, wherein each of the one or more responses received from respective devices of the invitee identities indicates whether the invitee identity will attend the event and is associated with a communication technique;
determining, by the server, at the event time, whether one or more of the invitee identities that indicated attendance at the event are absent;
determining, by the server, for an absent invitee identity, a current location of the absent invitee identity, comprising:
determining a current location of a respective mobile device of the absent invitee identity using a global positioning system;
generating, by the server, a probability distribution over states of interest for a plurality of communication techniques based on the gathered information;
inferring, by the server, based at least in part on the probability distribution, a preferred communication technique of the plurality of communication techniques for the absent invitee identity;
sending, by the server, a second message to the absent invitee identity using the preferred communication technique, wherein the second messages comprises a request for an estimated arrival time;
generating, by the server, an event report comprising the determined current location of the absent invitee identity; and
sending, by the server, to an event manager, the event report.

12. The system of claim 11, wherein the communication type is a telephone call, a text message, or an email.

13. The system of claim 11, wherein gathering information about the invitee identities further comprises receiving information from sources external to the server.

14. The system of claim 11, wherein each of the one or more responses comprises a time of day.

* * * * *